US011089618B2

(12) United States Patent
Liu et al.

(10) Patent No.: US 11,089,618 B2
(45) Date of Patent: Aug. 10, 2021

(54) GRANT-FREE TRANSMISSION METHOD, TERMINAL DEVICE, AND NETWORK DEVICE

(71) Applicant: Huawei Technologies Co., Ltd., Shenzhen (CN)

(72) Inventors: Yalin Liu, Shenzhen (CN); Xiaoying Xu, Shanghai (CN); Nathan Edward Tenny, San Diego, CA (US); Yong Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/394,848

(22) Filed: Apr. 25, 2019

(65) Prior Publication Data

US 2019/0254052 A1 Aug. 15, 2019

Related U.S. Application Data

(63) Continuation of application No. PCT/CN2017/101945, filed on Sep. 15, 2017.

(30) Foreign Application Priority Data

Oct. 26, 2016 (CN) .......................... 201610946018.X

(51) Int. Cl.
*H04W 72/12* (2009.01)
*H04W 56/00* (2009.01)
(Continued)

(52) U.S. Cl.
CPC ........ *H04W 72/1268* (2013.01); *H04B 7/005* (2013.01); *H04W 24/02* (2013.01);
(Continued)

(58) Field of Classification Search
CPC ......... H04W 72/1268; H04W 72/1284; H04W 72/1289; H04W 24/02; H04W 52/0216;
(Continued)

(56) References Cited

U.S. PATENT DOCUMENTS

| 8,442,076 B1 * | 5/2013 | Khlat | H04J 3/0632 |
| | | | 370/520 |
| 10,660,122 B2 * | 5/2020 | Yoshimoto | H04L 5/0055 |

(Continued)

FOREIGN PATENT DOCUMENTS

| CN | 101273581 A | 9/2008 |
| CN | 102918914 A | 2/2013 |

(Continued)

OTHER PUBLICATIONS

Sierra Wireless,"Transmission of Data Grant-Free in New State",3GPP TSG RAN WG2 Meeting #95b is R2-166059, Kaohsiung, Taiwan Oct. 10-14, 2016,total 8 pages.

(Continued)

*Primary Examiner* — Thomas R Cairns
(74) *Attorney, Agent, or Firm* — Leydig, Voit & Mayer, Ltd.

(57) ABSTRACT

This application discloses a grant-free transmission method, a terminal device, and a network device. The method includes: sending, by a terminal device, control information to a network device on a grant-free transmission resource; and receiving, by the terminal device, feedback information that is sent by the network device based on the control information. In this way, the terminal device sends the control information to the network device on the grant-free transmission resource, so that in a data transmission process, the terminal device can obtain a transmission parameter or resource information and properly adjust the transmission process of the terminal device in a timely manner.

17 Claims, 16 Drawing Sheets

(51) Int. Cl.
  *H04W 24/02* (2009.01)
  *H04B 7/005* (2006.01)
  *H04W 52/02* (2009.01)
  *H04W 60/00* (2009.01)
  *H04W 68/02* (2009.01)
  *H04W 74/00* (2009.01)

(52) U.S. Cl.
  CPC ... *H04W 52/0254* (2013.01); *H04W 56/0045* (2013.01); *H04W 72/1284* (2013.01); *H04W 72/1289* (2013.01); *H04W 52/0216* (2013.01); *H04W 60/00* (2013.01); *H04W 68/02* (2013.01); *H04W 74/002* (2013.01)

(58) Field of Classification Search
  CPC ......... H04W 52/0254; H04W 56/0045; H04W 60/00; H04W 68/02; H04W 74/002; H04W 8/00; H04W 8/26–28; H04W 12/02; H04W 16/18; H04W 36/0077; H04W 36/0083; H04W 48/08; H04W 48/18; H04W 48/20; H04W 52/48; H04W 56/004; H04W 56/005; H04W 72/0413; H04W 72/042; H04W 72/0446; H04W 74/0833; H04W 88/18; H04B 7/005; H04L 25/00; H04L 27/00; H04L 41/0823; Y02D 30/70
  See application file for complete search history.

(56) References Cited

U.S. PATENT DOCUMENTS

| | | | |
|---|---|---|---|
| 2005/0030919 A1* | 2/2005 | Lucidarme | H04B 7/2681 370/328 |
| 2013/0028204 A1 | 1/2013 | Dinan | |
| 2014/0148187 A1* | 5/2014 | Hong | H04W 64/00 455/452.1 |
| 2015/0085839 A1 | 3/2015 | Bergstrom et al. | |
| 2015/0141002 A1 | 5/2015 | Ma et al. | |
| 2016/0242132 A1* | 8/2016 | Bae | H04W 56/0005 |
| 2016/0242133 A1 | 8/2016 | Venkob et al. | |
| 2016/0302076 A1 | 10/2016 | Chou et al. | |
| 2016/0309335 A1 | 10/2016 | Pao et al. | |
| 2018/0098360 A1* | 4/2018 | Vos | H04W 72/14 |

FOREIGN PATENT DOCUMENTS

| | | | |
|---|---|---|---|
| CN | 103314623 A | 9/2013 | |
| CN | 104272821 A | 1/2015 | |
| CN | 108307495 A | 7/2018 | |
| EP | 3468265 A1 | 4/2019 | |
| GB | 2277232 A * | 10/1994 | ........ H04W 56/0035 |
| WO | 2016161545 A1 | 10/2016 | |

OTHER PUBLICATIONS

"Transmission of Data Grant-Free in New State," 3GPP TSG RAN WG2 Meeting #95bis, Kaohsiung, Taiwan, R2-166059, pp. 1-8, 3rd Generation Partnership Project—Valbonne, France (Oct. 10-14, 2016).

"Discussion on Efficient Small Data transmission in 'Inactive' State," 3GPP TSG-RAN WG2 Meeting #35bis,Kaohsiung, Taiwan, R2-166187, pp. 1-6, 3rd Generation Partnership Project—Valbonne, France (Oct. 10-14, 2016).

* cited by examiner

GRANT-FREE TRANSMISSION METHOD, TERMINAL DEVICE, AND NETWORK DEVICE

CROSS-REFERENCE TO RELATED APPLICATIONS

This application is a continuation of International Application No. PCT/CN2017/101945, filed on Sep. 15, 2017, which claims priority to Chinese Patent Application No. 201610946018.X, filed on Oct. 26, 2016. The disclosures of the aforementioned applications are hereby incorporated by reference in their entireties.

TECHNICAL FIELD

This application relates to the communications field, and in particular, to a grant-free transmission method, a terminal device, and a network device in the communications field.

BACKGROUND

A future 5G communications system needs to support a large number of different user equipment. To reduce energy consumption of the user equipment, it is an inevitable choice to make a terminal stay in an energy-saving state and reduce a signaling interaction process. Therefore, a new state (new state) is introduced into the 5G communications system, and the new state herein may be referred to as an ECO (economy or energy conservative operation) state, or referred to as a radio resource control (RRC) inactive state (RRC inactive state). If user equipment is in the RRC inactive state, the user equipment does not interact with a network when no data is being transmitted. Therefore, the user equipment neither maintains an air interface connection to the network, nor is in an uplink synchronization state. The introduced RRC inactive state is applicable to grant-free transmission, and grant-free transmission means that data transmission of the user equipment does not require real-time resource scheduling by the network.

In a grant-free transmission mode, a base station does not schedule a transmission resource for user equipment. When a plurality of user equipment need to simultaneously transmit data, the user equipment generally transmit the data on a pre-configured resource in a contention-based manner. In other words, the plurality of user equipment may perform contention-based transmission on a same resource. When the user equipment needs to transmit data, the user equipment performs transmission on a pre-configured resource. In a process in which a terminal device transmits data with a network device, the terminal device may need to adjust a related parameter or obtain information. Therefore, establishment of a proper signaling transmission manner is urgently required, so that in a data transmission process, a terminal device can obtain a transmission parameter or information and properly adjust the transmission process of the terminal device in a timely manner.

SUMMARY

This application provides a grant-free transmission method, a terminal device, and a network device, so that in a data transmission process, a terminal device can obtain a transmission parameter or information and properly adjust the transmission process of the terminal device in a timely manner.

According to a first aspect, a grant-free transmission method is provided. The method includes:
sending, by a terminal device, control information to a network device on a grant-free transmission resource; and
receiving, by the terminal device, feedback information that is sent by the network device based on the control information.

In this way, the terminal device sends the control information to the network device on the grant-free transmission resource, so that in a data transmission process, the terminal device can obtain a transmission parameter or resource information and properly adjust the transmission process of the terminal device in a timely manner.

Optionally, in an implementation of the first aspect, before the sending, by a terminal device, control information to a network device on a grant-free transmission resource, the method further includes: receiving, by the terminal device, capability information sent by the network device, where the capability information is used to indicate that the network device is capable of receiving, on the grant-free transmission resource, the control information sent by the terminal device.

Optionally, in an implementation of the first aspect, the sending, by a terminal device, control information to a network device on a grant-free transmission resource includes: determining, by the terminal device based on first status information of the terminal device, whether to send the control information to the network device; and sending, by the terminal device if the first status information meets a first condition, the control information to the network device on the grant-free transmission resource.

Optionally, in an implementation of the first aspect, the receiving, by the terminal device, feedback information that is sent by the network device based on the control information includes: receiving, by the terminal device in a second subframe following a first subframe that is used to send the control information, the feedback information that is sent by the network device based on the control information, where an interval between the second subframe and the first subframe meets a preset interval.

Optionally, in an implementation of the first aspect, the control information includes timing advance TA request information, and the feedback information includes TA information sent by the network device based on the TA request information.

In this way, the terminal device sends the TA request information on the grant-free transmission resource, so that when TA adjustment is required, the terminal device can obtain TA adjustment information to effectively adjust a TA.

When the TA of the terminal device is about to exceed a CP length range due to a factor such as a location change or a network deployment environment change of the terminal device, the method in this embodiment of this application may be used, so that signal interference caused because the TA of the terminal device exceeds the CP length range can be avoided and the system may have a CP length as short as possible during CP design to improve spectral efficiency.

Optionally, in an implementation of the first aspect, the first status information includes at least one type of the following information: a transmission time of the terminal device, a link loss of the terminal device, a moving speed of the terminal device, and a moving time of the terminal device.

For example, the terminal device may determine, based on transmission time information of the terminal device, whether to send the TA request information to the network device on the grant-free transmission resource. The transmission time information indicates data transmission duration of the terminal device. To be specific, after transmitting data for a period of time, the terminal device may actively send the TA request information to request for TA adjustment. For example, the terminal device may start a timer, and send the TA request information to the network device when the timer expires. In addition, the timer restarts counting every time the terminal device performs TA adjustment. A time length set for the timer is a maximum time length in which the terminal device can continuously perform data transmission.

In this way, the terminal device can periodically adjust its own TA, with no need to perform complex determining, so that the TA of the terminal device can be maintained within the CP length range, and data interference is avoided.

For another example, the terminal device may determine, based on the link loss of the terminal device, whether to send the TA request information to the network device on the grant-free transmission resource. For example, when determining that its own link loss exceeds a specific threshold, the terminal device may send the TA request information to the network device, to request for TA adjustment.

In this way, when the link loss of the terminal device is relatively high, TA adjustment may be performed in a timely manner, to ensure data transmission quality.

For another example, when moving, the terminal device may determine, based on the moving speed and the moving time of the terminal device, whether to send the TA request information to the network device on the grant-free transmission resource. For example, after moving for a specific period of time, the terminal device may send the TA request information to the network device. Alternatively, when moving at a specific moving speed and a product obtained by multiplying the moving speed and a moving time exceeds a specific threshold, the terminal device may send the TA request information to the network device.

In this way, when the terminal device is stationary or has a relatively low moving speed or a relatively short moving time, the terminal device does not need to adjust the TA frequently, to reduce power consumption. When the terminal device has a relatively high or low moving speed or a relatively long moving time and a TA change is easily caused, the terminal device can adjust the TA in a timely manner, to avoid data interference.

Optionally, in an implementation of the first aspect, the sending, by a terminal device, control information to a network device on a grant-free transmission resource includes: sending, by the terminal device, a first preamble sequence to the network device on the grant-free transmission resource, where the first preamble sequence is used to indicate the control information.

Optionally, in an implementation of the first aspect, the control information includes location information of the terminal device, and the feedback information includes location confirmation information sent by the network device based on the location information.

Therefore, after the terminal device sends the location information of the terminal device to the network device, the network device can determine a specific TRP that can provide a service for the terminal device and that is in an area in which the terminal device is currently located, so that the terminal device needs to be paged only in the TRP instead of in an entire tracking area, thereby greatly reducing a signaling paging amount.

It should be understood that, the location confirmation message may be, for example, sent by the network device on a downlink grant-free transmission resource, or implemented by the network device by sending control signaling through a downlink control channel at a specific moment after the terminal device sends the location information.

Optionally, in an implementation of the first aspect, the first status information includes at least one type of the following information: a transmission time of the terminal device, a moving speed of the terminal device, a moving time of the terminal device, and a quantity of transmission reception points TRPs passed through by the terminal device in a moving process.

For example, the terminal device may determine, based on transmission time information of the terminal device, whether to send the location information of the terminal device to the network device on the grant-free transmission resource. The transmission time information indicates grant-free transmission duration of the terminal device. For example, the terminal device may start a timer, and send the location information to the network device when the timer expires. In addition, the timer restarts counting every time the terminal device sends the location information. A time length set for the timer is a maximum time length in which the terminal device can continuously perform data transmission.

In this way, the terminal device can periodically notify the network device of the location information of the terminal device, with no need to perform complex determining, so that the network device can obtain a location of the terminal device and determine a proper paging range based on the location of the terminal device, thereby effectively reducing a paging amount.

For another example, the terminal device may determine, based on the moving speed and the moving time of the terminal device, whether to send the location information of the terminal device to the network device on the grant-free transmission resource.

For example, after moving for a specific period of time, the moving terminal device may send its own location information to the network device. Alternatively, when moving at a specific moving speed and a product obtained by multiplying the moving speed and a moving time exceeds a specific threshold, the terminal device sends its own location information to the network device.

In this way, when the terminal device is stationary or has a relatively low moving speed or a relatively short moving time, the terminal device does not need to send the location information frequently, to reduce power consumption of the terminal device. When the terminal device has a relatively high or low moving speed or a relatively long moving time and a location change is easily caused, the network device can obtain the location information of the terminal device in a timely manner, to avoid unnecessary signaling paging.

For another example, if the terminal device can identify a TRP, the terminal device may further determine, based on the quantity of TRPs passed through by the terminal device in a moving process, whether to perform location notification, that is, send its own location information to the network device. If the quantity of TRPs passed through by the terminal device in the moving process exceeds a specific quantity, the terminal device considers that location notification needs to be performed.

In this way, when the quantity of TRPs passed through by the terminal device is relatively small and a paging range changes little, location notification may not be performed. When the quantity of TRPs passed through by the terminal device is relatively large and a paging range may change greatly, the network device may obtain the location of the terminal device in a timely manner, and obtain, in a timely manner, a TRP range in which the terminal device needs to be paged.

Optionally, in an implementation of the first aspect, before the sending, by a terminal device, control information to a network device on a grant-free transmission resource, the method further includes: sending, by the terminal device, a second preamble sequence to the network device, where the second preamble sequence is used to indicate that the terminal device requests to send the location information to the network device; and receiving, by the terminal device, first resource indication information that is sent by the network device based on the second preamble sequence, where the first resource indication information indicates an uplink transmission resource used to send the location information; and the sending, by a terminal device, control information to a network device on a grant-free transmission resource includes: sending, by the terminal device, the location information to the network device on the uplink transmission resource indicated by the first resource indication information.

It should be understood that, the second preamble sequence may be configured by the network device and notified by the network device to the terminal device, or may be pre-agreed on by the network device and the terminal device, for example, stipulated in a protocol.

Optionally, in an implementation of the first aspect, the control information includes a buffer status report BSR, the feedback information includes second resource indication information sent by the network device based on the BSR, and the second resource indication information indicates an uplink transmission resource used to transmit uplink data of the terminal device; and the method further includes:

sending, by the terminal device, the uplink data to the network device on the uplink transmission resource indicated by the second resource indication information.

In this way, the terminal device sends the BSR on the grant-free transmission resource to obtain the resource used to transmit the uplink data, so that when there is a large amount of cached data, the terminal device can transmit the data in a connected state.

Optionally, in an implementation of the first aspect, the first status information includes a size of to-be-transmitted uplink data of the terminal device; and the sending, by the terminal device if the first status information meets a first condition, the control information to the network device on the grant-free transmission resource includes: if the size of the to-be-transmitted uplink data is greater than a first threshold, sending, by the terminal device, the BSR to the network device on the grant-free transmission resource.

According to a second aspect, a grant-free transmission method is provided. The method includes:

receiving, by a network device on a grant-free transmission resource, control information sent by a terminal device; and sending, by the network device, feedback information to the terminal device based on the control information.

Therefore, the network device receives, on the grant-free transmission resource, the control information sent by the terminal device, and returns the feedback information specific to the control information to the terminal device, so that in a data transmission process, the terminal device can obtain a transmission parameter or information and properly adjust the transmission process of the terminal device in a timely manner.

The network device may send the feedback information to the terminal device on a grant-free transmission resource or a non-grant-free transmission resource.

Optionally, in an implementation of the second aspect, before the receiving, by a network device on a grant-free transmission resource, control information sent by a terminal device, the method further includes: sending, by the network device, capability information to the terminal device, where the capability information is used to indicate that the network device is capable of sending, on the grant-free transmission resource, the control information to the terminal device.

Optionally, in an implementation of the second aspect, the sending, by the network device, control information to the terminal device includes: sending, by the network device, the feedback information to the terminal device in a second subframe following a first subframe that is used to receive the control information, where an interval between the second subframe and the first subframe meets a preset interval.

In this implementation, the network device may send the TA information in the second subframe following the first subframe in which the terminal device sends TA request information. A quantity N of subframes between the second subframe and the first subframe may be defined by a protocol or configured by the network device. If the terminal device supports a self-contained (self-contained) subframe, the network device may also send the TA information on a next subframe after receiving the TA request information.

Optionally, in an implementation of the second aspect, the control information includes timing advance TA request information, and the feedback information includes TA information sent by the network device based on the TA request information.

Therefore, the network device receives the TA request information sent by the terminal device, to provide TA adjustment information for the terminal device, so that the terminal device can adjust a TA in a timely manner when TA adjustment is required.

Optionally, in an implementation of the second aspect, the receiving, by a network device on a grant-free transmission resource, control information sent by a terminal device includes: receiving, by the network device on the grant-free transmission resource, a first preamble sequence sent by the terminal device, where the first preamble sequence is used to indicate the control information.

Optionally, in an implementation of the second aspect, the control information includes location information of the terminal device, and the feedback information includes location confirmation information sent by the network device based on the location information.

Therefore, by receiving the location information of the terminal device, the network device determines a specific TRP that can provide a service for the terminal device and that is in an area in which the terminal device is currently located, so that the terminal device needs to be paged only in the TRP instead of in an entire tracking area, thereby greatly reducing a signaling paging amount.

Optionally, in an implementation of the second aspect, before the receiving, by a network device on a grant-free transmission resource, control information sent by a terminal device, the method further includes: receiving, by the network device on the grant-free transmission resource, a second preamble sequence sent by the terminal device, where the second preamble sequence is used to indicate that the terminal device requests to send the location information to the network device; and sending, by the network device, first resource indication information to the terminal device based on the second preamble sequence, where the first resource indication information indicates an uplink transmission resource used to send the location information; and the receiving, by a network device on a grant-free transmission resource, control information sent by a terminal device includes: receiving, by the network device on the uplink transmission resource, the location information sent by the terminal device.

Optionally, in an implementation of the second aspect, the control information includes a buffer status report BSR, the feedback information includes second resource indication information sent by the network device based on the BSR, and the second resource indication information indicates an uplink transmission resource used to transmit uplink data of the terminal device; and the method further includes: receiving, by the network device on the uplink transmission resource indicated by the second resource indication information, the uplink data sent by the terminal device.

Therefore, by receiving the BSR of the terminal device on the grant-free transmission resource, the network device configures the resource used to transmit the uplink data for the terminal device, so that when there is a large amount of cached data, the terminal device can transmit the data in a connected state.

According to a third aspect, a grant-free transmission method is provided. The method includes: sending, by a terminal device, a first preamble sequence to a network device, where the first preamble sequence is used to indicate that the terminal device requests to obtain TA information of the terminal device; and receiving, by the terminal device, the TA information that is sent by the network device based on the first preamble sequence; and adjusting, by the terminal device, a TA of the terminal device based on the TA information.

In this way, the terminal device indicates, by using a specific preamble sequence, to the network device that the terminal device needs to adjust a TA, so that when TA adjustment is required, the terminal device can obtain TA adjustment information to effectively adjust the TA.

It should be understood that, the network device may include identification information of the first preamble sequence in the TA information, to indicate, in the sent TA information, a preamble sequence that is responded to, for differentiation between different preamble sequences.

Optionally, in an implementation of the third aspect, before the sending, by a terminal device, a first preamble sequence to a network device, the method further includes: receiving, by the terminal device, sequence indication information sent by the network device, where the sequence indication information is used to indicate the first preamble sequence.

Optionally, in an implementation of the third aspect, the TA information further includes an identifier of the first preamble sequence.

According to a fourth aspect, a grant-free transmission method is provided. The method includes: receiving, by a network device, a first preamble sequence sent by a terminal device, where the first preamble sequence is used to indicate that the terminal device requests to obtain TA information of the terminal device; and sending, by the network device, the TA information to the terminal device based on the first preamble sequence.

Therefore, by receiving a specific preamble sequence sent by the terminal device, the network device can learn that the terminal device currently needs to adjust a TA, and further provide TA adjustment information for the terminal device, so that when TA adjustment is required, the terminal device can adjust the TA in a timely manner.

Optionally, in an implementation of the fourth aspect, before the receiving, by a network device, a first preamble sequence sent by a terminal device, the method further includes: sending, by the network device, sequence indication information to the terminal device, where the sequence indication information is used to indicate the first preamble sequence.

Optionally, in an implementation of the fourth aspect, the TA information further includes an identifier of the first preamble sequence.

According to a fifth aspect, a grant-free transmission method is provided. The method includes: determining, by a terminal device, second status information of the terminal device specific to data transmission on a grant-free transmission resource; and receiving, by the terminal device if the second status information meets a second condition, TA information sent by a network device.

Therefore, when the terminal device meets a condition for TA adjustment, the network device can actively send the TA information to the terminal device, so that the terminal device adjusts a TA based on the TA information.

Optionally, in an implementation of the fifth aspect, the second status information includes a quantity of data transmission times of the terminal device, where the receiving, by the terminal device if the second status information meets a second condition, TA information sent by a network device includes: if the quantity of data transmission times reaches a threshold of a quantity of transmission times, receiving, by the terminal device, the TA information sent by the network device.

Optionally, in an implementation of the fifth aspect, the second status information includes a data transmission time of the terminal device, where the receiving, by the terminal device if the second status information meets a second condition, TA information sent by a network device includes: if the data transmission time reaches a transmission time threshold, receiving, by the terminal device, the TA information sent by the network device.

According to a sixth aspect, a grant-free transmission method is provided. The method includes: determining, by a network device, second status information of a terminal device specific to data transmission on a grant-free transmission resource; and sending, by the network device if the second status information meets a second condition, TA information to the terminal device.

Therefore, by obtaining status information of the terminal device specific to data transmission, the network device can actively send the TA information to the terminal device when the terminal device requires TA adjustment, so that the terminal device adjusts a TA.

For example, the TA information may be sent together with acknowledgement (ACK) feedback or negative acknowledgement (NACK) feedback of the network device, or sent separately, which depends on whether the ACK/NACK feedback is supported.

Optionally, in an implementation of the sixth aspect, the second status information includes a quantity of data transmission times of the terminal device, where the sending, by the network device if the second status information meets a second condition, TA information to the terminal device includes: if the quantity of data transmission times reaches a threshold of a quantity of transmission times, sending, by the network device, the TA information to the terminal device.

Optionally, in an implementation of the sixth aspect, the second status information includes a data transmission time of the terminal device, where the sending, by the network device if the second status information meets a second condition, TA information to the terminal device includes: if the data transmission time reaches a transmission time threshold, sending, by the network device, the TA information to the terminal device.

For example, every time the terminal device performs data transmission, the network device may perform TA adjustment for the terminal device once. After completing data transmission once, the terminal device waits for the TA information from the network device. Alternatively, the network device configures a maximum quantity of transmission times based on a data transmission frequency of the terminal device, to be specific, how many times of transmission are performed by the terminal device before the TA needs to be adjusted once, and the network device may send the TA information to the terminal device when a quantity of times of data transmission performed by the terminal device on the grant-free transmission resource reaches the maximum quantity of transmission times. Alternatively, the network may configure a timer for the terminal, and when the timer expires, the network device sends the TA information to the terminal device.

According to a seventh aspect, a terminal device is provided, and the terminal device may be configured to execute various processes that are executed by the terminal device in the grant-free transmission method according to the first aspect and various implementations. The network device includes: a sending unit, configured to send control information to a network device on a grant-free transmission resource; and a receiving unit, configured to receive feedback information that is sent by the network device based on the control information sent by the transmitter.

According to an eighth aspect, a network device is provided, and the network device may be configured to execute various processes that are executed by the network device in the grant-free transmission method according to the second aspect and various implementations. The network device includes: a receiving unit, configured to receive, on a grant-free transmission resource, control information sent by a terminal device; and a sending unit, configured to send feedback information to the terminal device based on the control information.

According to a ninth aspect, a terminal device is provided, and the terminal device may be configured to execute various processes that are executed by the terminal device in the grant-free transmission method according to the third aspect and various implementations. The network device includes: a sending unit, configured to send a first preamble sequence to a network device, where the first preamble sequence is used to indicate that the terminal device requests to obtain TA information of the terminal device; a receiving unit, configured to receive the TA information that is sent by the network device based on the first preamble sequence; and a processing unit, configured to adjust a TA of the terminal device based on the TA information.

According to a tenth aspect, a network device is provided, and the network device may be configured to execute various processes that are executed by the network device in the grant-free transmission method according to the fourth aspect and various implementations. The network device includes: a receiving unit, configured to receive a first preamble sequence sent by a terminal device, where the first preamble sequence is used to indicate that the terminal device requests to obtain TA information of the terminal device; and a sending unit, configured to send the TA information to the terminal device based on the first preamble sequence.

According to an eleventh aspect, a terminal device is provided, and the terminal device may be configured to execute various processes that are executed by the terminal device in the grant-free transmission method according to the fifth aspect and various implementations. The terminal device includes: a determining unit, configured to determine second status information of the terminal device specific to data transmission on a grant-free transmission resource; and a receiving unit, configured to receive, when the determining unit determines that the second status information meets a second condition, TA information sent by a network device.

According to a twelfth aspect, a network device is provided, and the network device may be configured to execute various processes that are executed by the network device in the grant-free transmission method according to the sixth aspect and various implementations. The network device includes: a determining unit, configured to determine second status information of a terminal device specific to data transmission on a grant-free transmission resource; and a sending unit, configured to send, when the determining unit determines that the second status information meets a second condition, TA information to the terminal device.

According to a thirteenth aspect, a terminal device is provided, and the terminal device may be configured to execute various processes that are executed by the terminal device in the grant-free transmission method according to the first aspect and various implementations. The terminal device includes the processor, the transmitter, and the receiver. The transmitter is configured to send control information to a network device on a grant-free transmission resource; and the receiver is configured to receive feedback information that is sent by the network device based on the control information sent by the transmitter.

According to a fourteenth aspect, a network device is provided, and the network device may be configured to execute various processes that are executed by the network device in the grant-free transmission method according to the second aspect and various implementations. The network device includes the processor, the transmitter, and the receiver. The receiver is configured to receive, on a grant-free transmission resource, control information sent by a terminal device; and the transmitter is configured to send feedback information to the terminal device based on the control information received by the receiver.

According to a fifteenth aspect, a terminal device is provided, and the terminal device may be configured to execute various processes that are executed by the terminal device in the grant-free transmission method according to the third aspect and various implementations. The terminal device includes the processor, the transmitter, and the receiver. The transmitter is configured to send a first preamble sequence to a network device, where the first preamble sequence is used to indicate that the terminal device requests to obtain TA information of the terminal device; and the receiver is configured to receive the TA information that is sent by the network device based on the first preamble sequence sent by the transmitter; and the processor is configured to adjust a TA of the terminal device based on the TA information received by the receiver.

According to a sixteenth aspect, a network device is provided, and the network device may be configured to execute various processes that are executed by the network device in the grant-free transmission method according to the fourth aspect and various implementations. The network device includes the processor, the transmitter, and the receiver. The receiver is configured to receive a first preamble sequence sent by a terminal device, where the first preamble sequence is used to indicate that the terminal device requests to obtain TA information of the terminal device; and the transmitter is configured to send the TA information to the terminal device based on the first preamble sequence received by the receiver.

According to a seventeenth aspect, a terminal device is provided, and the terminal device may be configured to execute various processes that are executed by the terminal device in the grant-free transmission method according to the fifth aspect and various implementations. The network device includes the processor, the transmitter, and the receiver. The processor is configured to determine second status information of the terminal device specific to data transmission on a grant-free transmission resource; and the receiver is configured to receive, when the processor determines that the second status information meets a second condition, TA information sent by a network device.

According to an eighteenth aspect, a network device is provided, and the network device may be configured to execute various processes that are executed by the network device in the grant-free transmission method according to the sixth aspect and various implementations. The network device includes the processor, the transmitter, and the receiver. The processor is configured to determine second status information of a terminal device specific to data transmission on a grant-free transmission resource; and the transmitter is configured to send, when the processor determines that the second status information meets a second condition, TA information to the terminal device.

According to a nineteenth aspect, a computer readable storage medium is provided, where the computer readable storage medium stores a program, and the program enables a terminal device to execute the grant-free transmission method according to any one of the first aspect and various implementations of the first aspect.

According to a twentieth aspect, a computer readable storage medium is provided, where the computer readable storage medium stores a program, and the program enables a network device to execute the grant-free transmission method according to any one of the second aspect and various implementations of the second aspect.

According to a twenty-first aspect, a computer readable storage medium is provided, where the computer readable storage medium stores a program, and the program enables a terminal device to execute the grant-free transmission method according to any one of the third aspect and various implementations of the third aspect.

According to a twenty-second aspect, a computer readable storage medium is provided, where the computer readable storage medium stores a program, and the program enables a network device to execute the grant-free transmission method according to any one of the fourth aspect and various implementations of the fourth aspect.

According to a twenty-third aspect, a computer readable storage medium is provided, where the computer readable storage medium stores a program, and the program enables a terminal device to execute the grant-free transmission method according to any one of the fifth aspect and various implementations of the fifth aspect.

According to a twenty-fourth aspect, a computer readable storage medium is provided, where the computer readable storage medium stores a program, and the program enables a network device to execute the grant-free transmission method according to any one of the sixth aspect and various implementations of the sixth aspect.

According to the solutions in the embodiments of this application, the terminal device may send control information with a specific function to the network device on the grant-free transmission resource, for example, the TA information, the location information, and the BSR, so that the network device can provide a corresponding configuration parameter for the terminal device based on the message, thereby effectively meeting a requirement of the terminal device.

DESCRIPTION OF EMBODIMENTS

Figure 1:
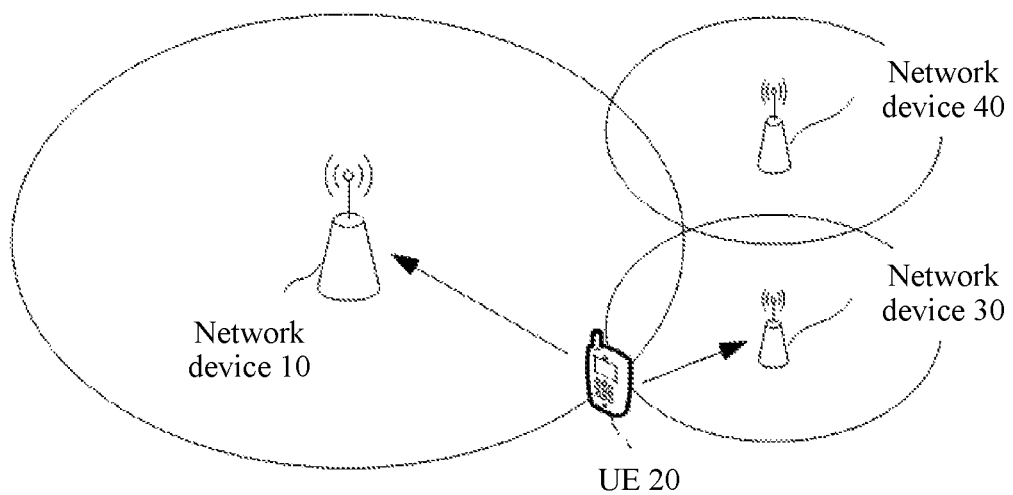
FIG. 1 is a schematic architectural diagram of a communications system that applies an embodiment of this application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that, the technical solutions in the embodiments of the present invention may be applied to various communications systems, such as: a Global System for Mobile Communications (GSM), a Code Division Multiple Access (CDMA) system, a Wideband Code Division Multiple Access (WCDMA) system, a Long Term Evolution (LTE) system, an LTE frequency division duplex (FDD) system, an LTE time division duplex (TDD) system, a Universal Mobile Telecommunications System (UMTS), and a future 5G communications system.

This application describes the embodiments with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The access terminal may be a cellular phone, a cordless phone, a Session Initiation Protocol (SIP) phone, a wireless local loop (WLL) station, a personal digital assistant (PDA), a hand-held device having a wireless communications function, a computing device, or another processing device connected to a wireless modem, an in-vehicle device, a wearable device, a terminal device in a future 5G network, a terminal device in a future evolved PLMN, or the like.

This application describes the embodiments with reference to a network device. The network device may be a device that is configured to communicate with a terminal device, for example, a base transceiver station (BTS) in a GSM system or a CDMA system, or a NodeB (NB) in a WCDMA system, or an evolved NodeB (eNB or eNodeB) in an LTE system, or the network device may be a relay station, an access point, an in-vehicle device, a wearable device, a network side device in a future 5G network, or a network device in a future evolved PLMN.

FIG. 1 is a schematic architectural diagram of a communications system that applies an embodiment of this application. As shown in FIG. 1, the communications system may include a network device 10, a network device 30, a network device 40, and a terminal device 20 (UE for short in the figure), which are connected by using a wireless connection, a wired connection, or another manner. The network device 10, the network device 30, and the network device 40 are different transmission reception points (TRP) in a same cell. The terminal device 20 may be stationary, or may move in the cell. When the terminal device 20 is in a moving process, different transmission devices may provide services for the terminal device 20.

A network in this embodiment of this application may be a public land mobile network (PLMN), a device-to-device (D2D) network, a machine-to-machine/man (M2M) network, or another network. FIG. 1 is only a simplified schematic diagram used as an example. The network may further include another network device and another terminal device, which are not shown in FIG. 1.

The solutions proposed in this application may be applied to grant-free (Grant Free) transmission. The grant-free transmission can resolve a plurality of services in a future network, for example, a machine type communication (MTC) service or an ultra-reliable and low latency communications (URLLC) service, to meet service transmission requirements for a low latency and high reliability. The grant-free transmission may be specific to transmission of uplink data. A person skilled in the art may know that, the grant-free transmission may also be referred to by another name, for example, spontaneous access, spontaneous multiple access, contention-based multiple access, or the like.

The data in this embodiment of this application may include service data or signaling data. A grant-free transmission resource may include but is not limited to one or a combination of a plurality of the following resources: a time-domain resource such as a radio frame, a subframe, or a symbol; a frequency-domain resource such as a sub-carrier or a resource block; a space-domain resource such as a transmit antenna or a beam; a code-domain resource such as a sparse code multiple access (SCMA) codebook group, a low density signature (LDS) group, or a CDMA code group; an uplink pilot resource; an interleaving resource; and a channel coding manner.

Transmission may be performed by using the foregoing transmission resources according to the following control mechanisms, including but not limited to uplink power control, such as uplink transmit power upper limit control; modulation and coding scheme settings, such as settings of a transport block size, a bit rate, and a quantity of modulation orders; and a retransmission mechanism, such as a hybrid automatic repeat request (HARQ) mechanism.

The terminal device 20 and the network device 10 are used as an example. Currently, the network device 10 provides a service for the terminal device 20. If the terminal device 20 is in an RRC inactive state, the terminal device 20 does not exchange information with the network device 10 when no data is being transmitted. In this way, the terminal device 20 does not maintain uplink synchronization with the network device 10. With a grant-free transmission burst, because the terminal device 20 is asynchronous with the network device 10, the terminal device may perform uplink transmission with the network device 10 based on a timing advance TA. However, the TA may not adapt to a cyclic prefix (CP) due to a relatively large cell radius, and data transmission on an adjacent physical resource block (PRB) is interfered with. In other words, if the TA is within a CP range, data transmission is not affected even if no TA adjustment is performed before the uplink transmission; or if the TA exceeds the CP range, transmission is interfered with and transmission on an adjacent physical resource block is affected. Therefore, a size of the TA determines whether the user equipment can perform data transmission in the RRC inactive state.

The RRC inactive state in this embodiment of this application may also be referred to as an ECO state, or the like. If the terminal device is in the RRC inactive state, the terminal device is asynchronous with the network device when no data needs to be transmitted between the terminal device and the network device, and the terminal device and the network device do not interact with each other.

In a cellular-based Narrowband Internet of Things (NB-IoT), if a terminal device in an idle state moves in the system, when the terminal device needs to transmit data, the terminal device transmits the data based on a connection resume (resume) process.

Figure 2:
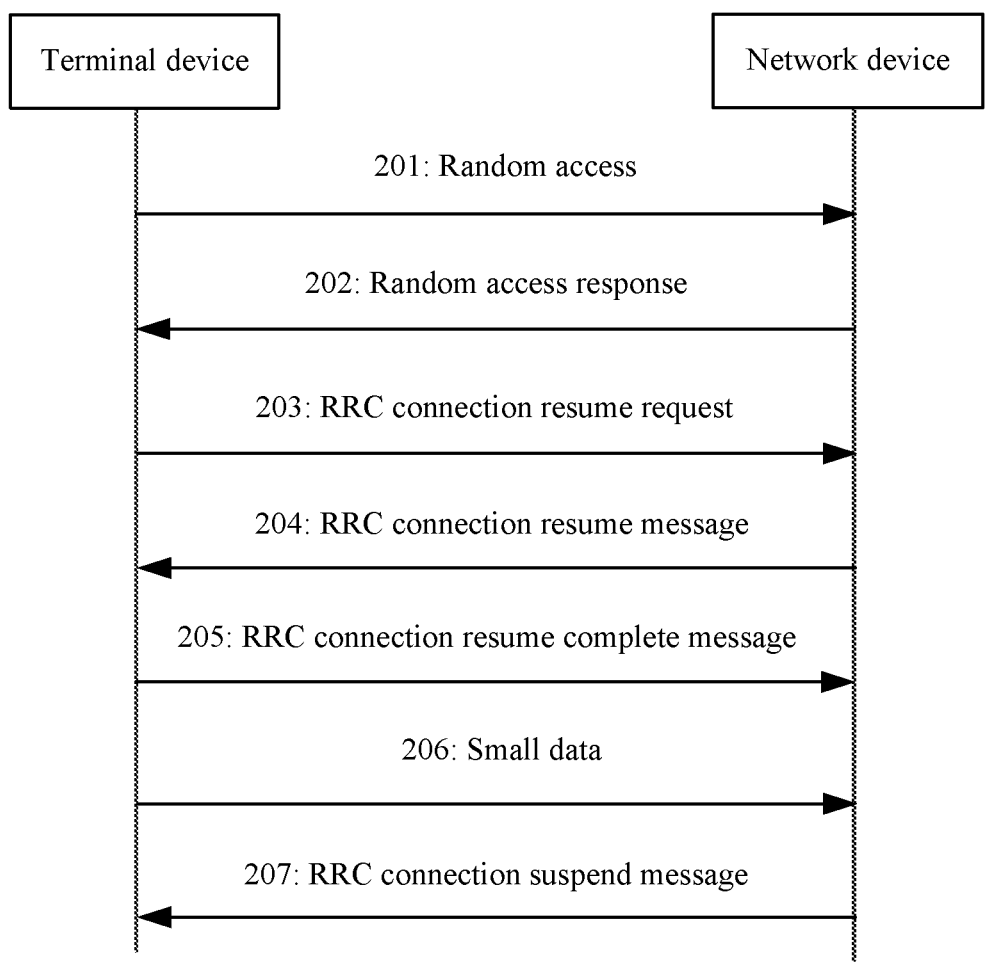
FIG. 2 is a schematic flowchart of small data transmission that is based on a resumed connection.

FIG. 2 is a schematic flowchart of small data transmission that is based on a resumed connection. FIG. 2 shows a network device and a terminal device. As shown in FIG. 2, the grant-free transmission process is as follows:

201: The terminal device initiates random access (RA), to send a preamble (preamble) sequence to the network device.

202: The network device returns a random access response (RAR) to the terminal device, to establish a signaling radio bearer (SRB0), where the random access response includes a timing advance TA and a resource request grant (Grant for SRB0).

203: The terminal device sends a radio resource control (RRC) connection resume request (RRC Connection Resume Request) to the network device based on the SRB0.

204: The network device sends an RRC connection resume message to the terminal device.

205: The terminal device sends an RRC connection resume complete message to the network device.

206: The terminal device establishes a data radio bearer (Data Radio Bearers, DRB), to send uplink small data (Small Data Tx) to the network device 10.

207: The network device sends an RRC connection suspend (RRC Connection Suspend) message to the terminal device.

It may be seen that, the transmission herein is typical and is based on a conventional random access process. The terminal device 20 first needs to send a preamble. The network device adjusts a TA of the terminal device and allocates an uplink resource. The terminal device requests to resume a connection that is mainly used to obtain a context (context) of the terminal device on the network. After successfully obtaining the context, the network device can perform small data transmission with the terminal device. This process is relatively long and requires much signaling.

Therefore, a small data transmission process based on the NB-IoT causes excessive signaling overheads, and is not conducive to energy saving of the terminal device.

Figure 3:
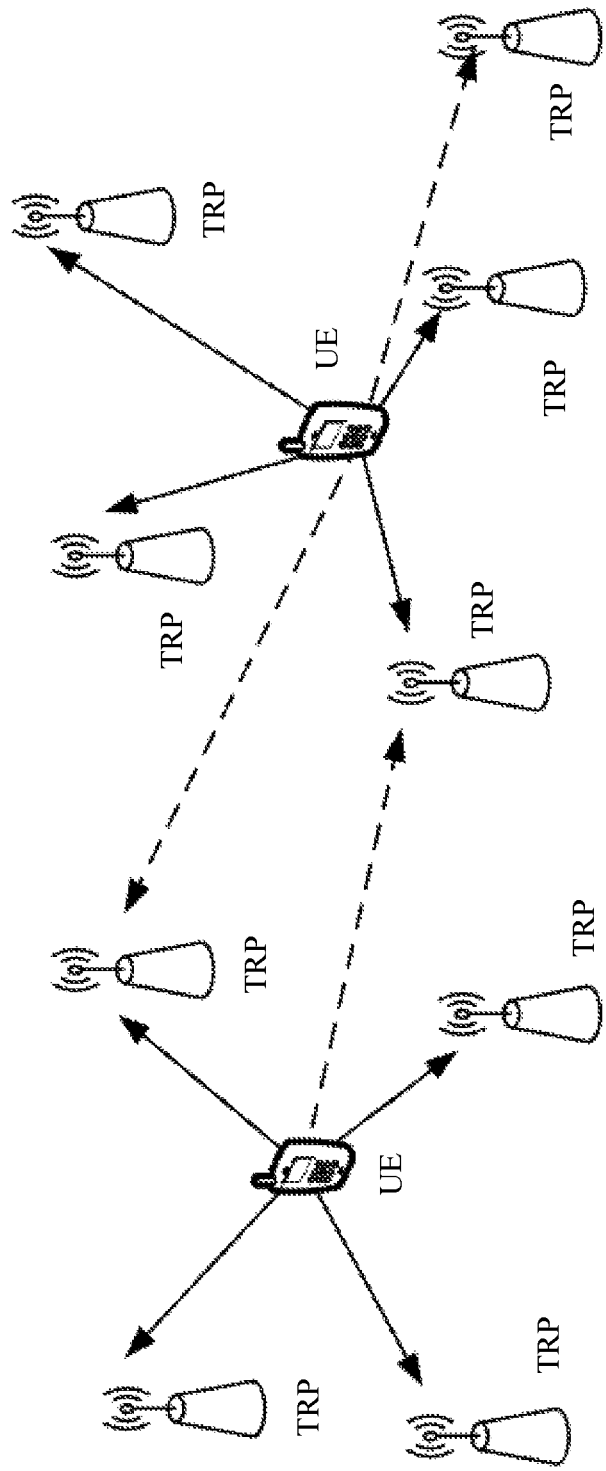
FIG. 3 is a schematic diagram of a non-cellular cell.

Another non-cellular access method considers future densely deployed transmission reception points. For example, FIG. 3 is a schematic diagram of a non-cellular cell. When the terminal device moves in the network, frequent handovers may be caused. To avoid frequent handovers, a plurality of TRPs may form a set and this set is a cell. When moving in the cell, the terminal device does not perceive a TRP change, and the network can automatically track a TRP in which the terminal device is currently located, and determine which TRP provides a service for the terminal device. For example, FIG. 3 includes TRPs and terminal devices. A solid line indicates that a TRP can detect a terminal device, that is, the TRP can provide a service for the UE. A dashed line indicates that a TRP cannot detect a terminal device, that is, the TRP cannot provide a service for the UE. For the network to track the TRP in which the terminal device is currently located, the terminal device needs to periodically send an uplink tracking signal. A sending frequency depends on a moving speed of the terminal device. For example, a stationary terminal device may send an uplink tracking signal once every long time. A terminal device at a medium speed sends an uplink tracking signal at a frequency that may be equal to a time required for passing through a coverage area of one TRP, for example, once every 1 second or longer. A terminal device moving fast may need to send an uplink tracking signal more frequently.

It is also considered that the uplink tracking signal is sent in the RRC inactive state. Tracking signal sending consumes system resources. Therefore, frequent sending is not conducive to resource use and affects energy consumption of the terminal. However, if a sending frequency is excessively low, it is possible that the network does not know a location of the terminal device in the network, and performs broadcast in the entire cell or an entire tracking area when downlink data arrives, causing excessive paging (paging) load.

This method is feasible in a scenario with evenly deployed TRPs or when a distance from the terminal device to the TRP meets a CP range. However, if a coverage area of the TRP is relatively large, a CP length needs to be long, and a relatively long CP length may cause a loss of spectral efficiency, and is not conducive to spectral efficiency improvement. A scenario with both a macro cell and a small cell deployed is very likely to exist in the future. When a CP length cannot meet a requirement, without TA adjustment, it is difficult to ensure that the CP length meets the requirement.

In consideration of complexity of a future network deployment scenario, a scenario in which a macro cell and a micro cell coexist may be relatively common. Therefore, CP design of NR (new radio) may be difficult. If a CP length is designed to be excessively long, large overheads are caused. If a CP length is designed to be excessively short, a TA may exceed a CP length range, and consequently an adjacent PRB is interfered with and spectral efficiency decreases.

Figure 4:
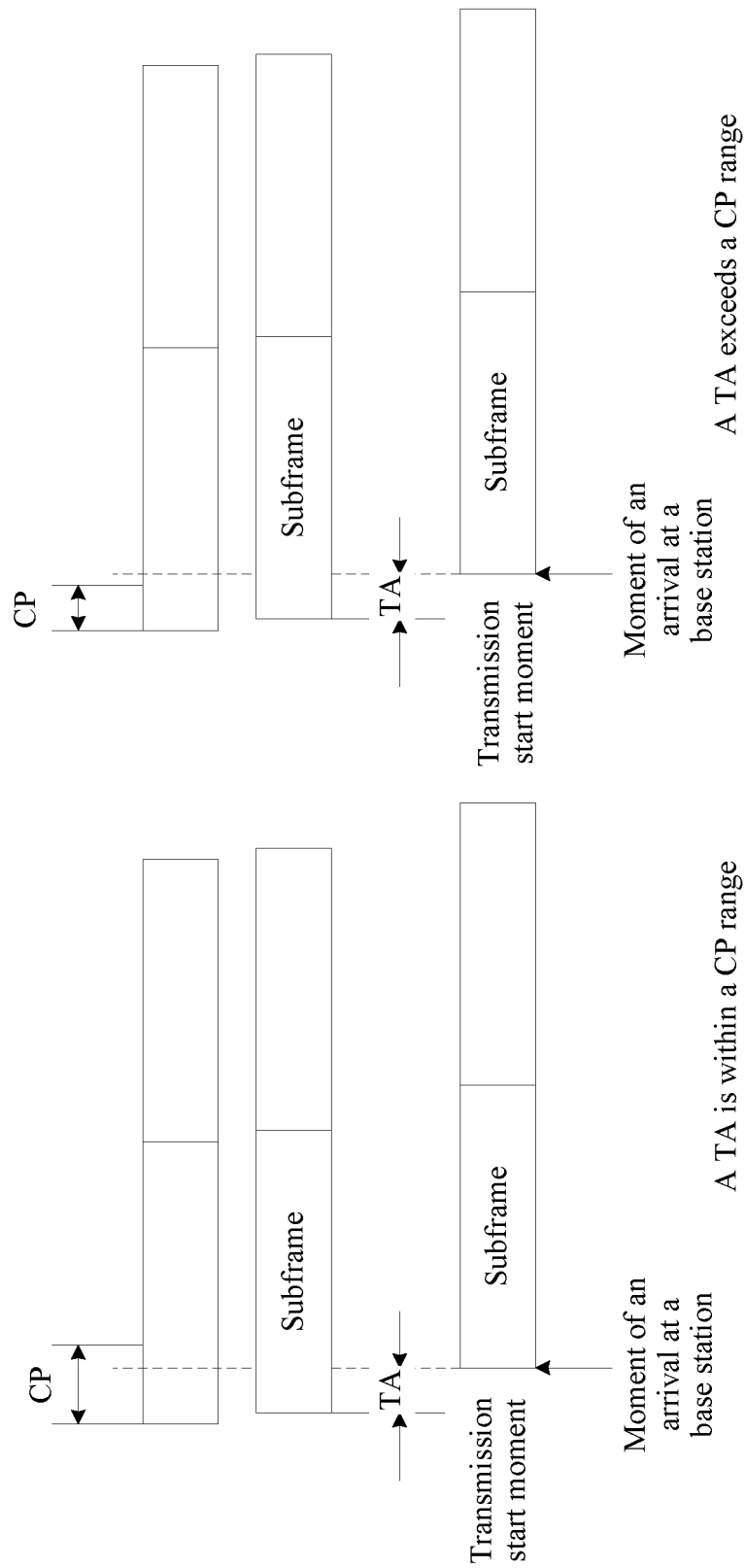
FIG. 4 is a schematic diagram of a relationship between a TA and a CP length.

For example, FIG. 4 is a schematic diagram of a relationship between a TA and a CP. Some TRPs in the cell have larger coverage areas, such as the network device 10 in FIG. 1, and some TRPs have smaller coverage areas, such as the network device 20 and the network device 30 in FIG. 1. Therefore, when a terminal device is in the RRC inactive state and when the terminal device moves in the cell and a data transmission burst occurs, a TA may exceed a CP range due to different coverage areas, and data transmission on an adjacent PRB is interfered with. In a left part in FIG. 4, a TA is within a CP range. In a right part in FIG. 4, a TA exceeds a CP range and as a result, data transmitted by another terminal device on an adjacent PRB is interfered with.

In the grant-free transmission process in this embodiment of this application, control signaling used for adjusting the TA is sent on the grant-free transmission resource. The TA of the terminal device in the RRC inactive state can be effectively adjusted, thereby avoiding data interference caused by a mismatch between the TA and the CP, quickly implementing transmission, and reducing signaling overheads.

Figure 5:
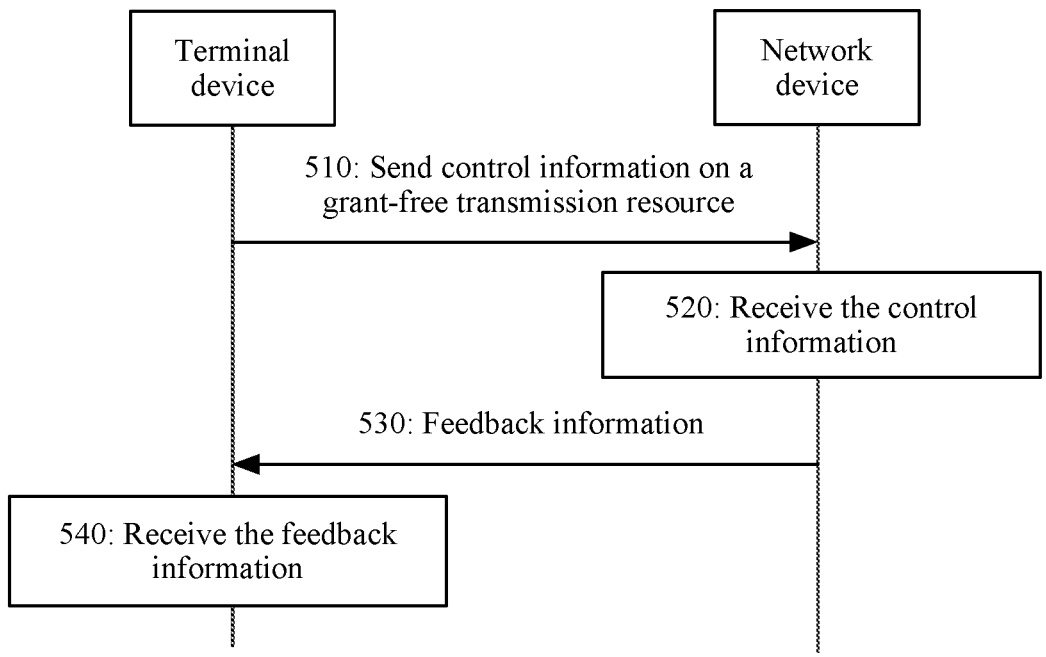
FIG. 5 is a process interaction diagram of a grant-free transmission method according to an embodiment of this application.

FIG. 5 is a process interaction diagram of a grant-free transmission method according to an embodiment of this application. FIG. 5 shows a network device and a terminal device. The network device may be, for example, the network device 10, the network device 30, or the network device 40 shown in FIG. 1. The terminal device may be, for example, the UE 20 shown in FIG. 1. Grant-free transmission may be performed between the terminal device and the network device in FIG. 5. By using the method in this embodiment of this application, the terminal device may perform data transmission with a plurality of network devices including the network device. For a method executed by another network device, refer to the method executed by the network device. For brevity, details are not described herein. Optionally, this method may be applied to grant-free transmission, or may be applied to another scenario. The grant-free transmission is used as an example herein for description, that is, uplink transmission between the terminal device and the network device is grant-free transmission, and a used transmission resource is a grant-free transmission resource. As shown in FIG. 5, the grant-free transmission method includes the following steps.

510: The terminal device sends control information to the network device on a grant-free transmission resource.

Specifically, the terminal device may send the control information to the network device on the grant-free transmission resource, to request to obtain a transmission parameter or resource information required by the terminal device in a transmission process, or to provide a related transmission parameter of the terminal device for the network device. For example, the terminal device may send TA request information to the network device, for example, send a TA request message, to request to obtain TA adjustment information of the terminal device for TA adjustment. When a size of to-be-transmitted data of the terminal device is greater than a specific threshold, the terminal device may send a buffer status report BSR to the network device, to request to obtain a transmission resource used to transmit the data. Alternatively, the terminal device may send location information of the terminal device to the network device and receive location confirmation information returned by the network device, so that the network device can obtain a location of the terminal device in a timely manner, to further determine a proper paging range, thereby avoiding unnecessary paging.

Optionally, before 510, the method may further include: sending, by the network device, grant information to the terminal device, where the grant information is used to indicate that the terminal device can send the control information to the network device on the grant-free transmission resource; and receiving, by the terminal device, the grant information sent by the network device.

In other words, before a TA is sent, the network device needs to send the grant information to the terminal device, to notify the terminal device whether the terminal device supports sending the TA request information on the grant-free transmission resource. For example, the grant information may be sent to the terminal device by using a system message or dedicated RRC signaling.

Optionally, that the terminal device sends control information to the network device on a grant-free transmission resource in 510 includes: determining, by the terminal device based on first status information of the terminal device, whether to send the control information to the network device; and sending, by the terminal device if the first status information meets a first condition, the control information to the network device on the grant-free transmission resource.

Specifically, the terminal device may actively determine, in a specific manner, whether the terminal device needs to send the control information, and send the control information to the network device when the control information needs to be sent, to request to obtain related transmission information or to report information about the terminal device to the network device. The terminal device may obtain its own first status information in real time, and trigger sending of the control information when the first status information meets the first condition. For example, the first condition may be that a value indicated by the first status information reaches a preset threshold.

Optionally, the terminal device may determine, based on information such as transmission time information of the terminal device, a link loss of the terminal device, a moving speed of the terminal device, and a moving time of the terminal device, whether to send the TA request information on the grant-free transmission resource. For example, if the first status information is the transmission time information of the terminal device, the first condition may be that a transmission time of the terminal device exceeds a preset threshold. If the first status information is the link loss of the terminal device, the first condition may be that the link loss exceeds a preset threshold. If the first status information is the moving speed and the moving time of the terminal device, the first condition may be that a product obtained by multiplying the moving speed and the moving time exceeds a preset threshold.

520: The network device receives, on the grant-free transmission resource, the control information sent by the terminal device.

530: The network device sends feedback information to the terminal device based on the control information.

The network device may send the feedback information to the terminal device on a grant-free transmission resource or a non-grant-free transmission resource.

Optionally, that the network device sends feedback information to the terminal device based on the control information in 530 includes: sending, by the network device, the feedback information to the terminal device in a second subframe following a first subframe that is used to receive the control information, where an interval between the second subframe and the first subframe meets a preset interval.

In this embodiment, after sending the control information, the terminal device receives, on a determined resource location, the feedback information from the network device. The network device may send the feedback information in the second subframe following the first subframe in which the terminal device sends the control information. A quantity N of subframes between the second subframe and the first subframe may be defined by a protocol or configured by the network device. If the terminal device supports a self-contained subframe, the network device may also send the location confirmation information on a next subframe after receiving the location information.

540: The terminal device receives the feedback information that is sent by the network device based on the control information.

Therefore, in this embodiment of this application, the terminal device sends the control information to the network device on the grant-free transmission resource, so that in a data transmission process, the terminal device can obtain a transmission parameter or information and properly adjust the transmission process of the terminal device in a timely manner.

The following describes in detail the grant-free transmission method in this embodiment of this application with reference to FIG. 6 to FIG. 14 by using three cases an example, where in the three cases, the control information is separately the TA request information, the location information of the terminal device, and the BSR message.

Case 1:

The control information includes timing advance TA request information, and the feedback information includes TA information sent by the network device based on the TA request information.

Figure 6:
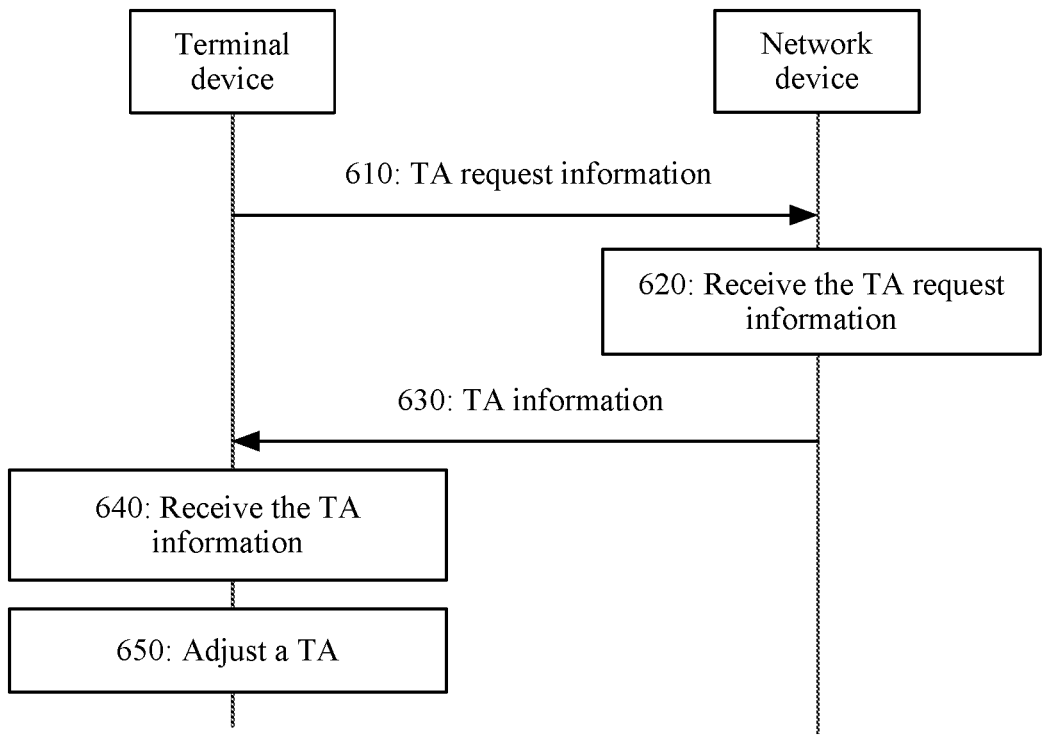
FIG. 6 is a process interaction diagram of a grant-free transmission method according to an embodiment of this application.

FIG. 6 is a process interaction diagram of a grant-free transmission method according to an embodiment of this application. FIG. 6 shows a network device and a terminal device, and grant-free transmission may be performed between the terminal device and the network device. As shown in FIG. 6, the grant-free transmission method includes the following steps.

610: The terminal device sends TA request information to the network device on a grant-free transmission resource.

The TA request information may be control signaling. For example, the TA request information may be control signaling in a specific format, for example, a Media Access Control (MAC) control element (CE). A specific identifier (ID) may be used to indicate that the TA request information is used by the terminal device to request for TA adjustment. Further, the TA request information further includes an ID of the terminal device.

Optionally, that the terminal device sends TA request information to the network device on a grant-free transmission resource in 610 may include:

determining, by the terminal device based on first status information of the terminal device, whether to send the TA request information to the network device; and sending, by the terminal device if the first status information meets a first condition, the TA request information to the network device on the grant-free transmission resource.

Optionally, the first status information includes at least one type of the following: a transmission time of the terminal device, a link loss of the terminal device, a moving speed of the terminal device, and a moving time of the terminal device.

Specifically, the terminal device may actively determine, in a specific manner, whether the terminal device needs to perform TA adjustment, and send the TA request information to the network device when TA adjustment is required, to request for TA adjustment. The following uses three manners as an example to describe in detail how the terminal device determines whether to send the TA request information to the network device for TA adjustment, where the three manners are the transmission time of the terminal device, the link loss of the terminal device, and the moving speed of the terminal device and the moving time of the terminal device.

Manner 1:

The terminal device may determine, based on transmission time information of the terminal device, whether to send the TA request information to the network device on the grant-free transmission resource.

The transmission time information indicates data transmission duration of the terminal device, namely, duration of data transmission performed by the terminal device on the grant-free transmission resource.

For example, the terminal device may start a timer, and send the TA request information to the network device when the timer expires. In addition, the timer restarts counting every time the terminal device performs TA adjustment. A time length set for the timer is a maximum time length in which the terminal device can continuously perform data transmission.

It may be understood that, in this embodiment, sending the TA request information by the terminal device is a manner of periodic TA adjustment. To be specific, after transmitting data for a period of time, the terminal device may actively send the TA request information to request for TA adjustment.

In this way, the terminal device can continually adjust its own TA, with no need to perform complex determining, so that the TA of the terminal device can be maintained within a CP length range, and data interference is avoided.

Manner 2:

The terminal device may determine, based on the link loss of the terminal device, whether to send the TA request information to the network device on the grant-free transmission resource.

In this embodiment, the terminal device needs to determine, based on its own link loss status, whether to perform TA adjustment. For example, when the terminal device determines that its own link loss exceeds a specific threshold, the terminal device may trigger TA adjustment, that is, send the TA request information to the network device, to request for TA adjustment information of the terminal device.

In this way, when the link loss of the terminal device is relatively high, TA adjustment may be performed in a timely manner, to ensure data transmission quality.

Manner 3:

The terminal device may determine, based on the moving speed and the moving time of the terminal device, whether to send the TA request information to the network device on the grant-free transmission resource.

Specifically, the terminal device may determine, based on the moving speed and the moving time of the terminal device, whether to perform TA adjustment, for example, send the TA request information to the network device after the moving terminal device moves for a specific period of time, or send the TA request information to the network device when the terminal device moves at a specific moving speed and a product obtained by multiplying the moving speed and the moving time exceeds a specific threshold.

In this way, when the terminal device is stationary or has a relatively low moving speed or a relatively short moving time, the terminal device does not need to adjust the TA frequently, to reduce power consumption. When the terminal device has a relatively high or low moving speed or a relatively long moving time and a TA change is easily caused, the terminal device can adjust the TA in a timely manner, to avoid data interference.

620: The network device receives the TA request information sent by the terminal device.

630: The network device sends TA information to the terminal device.

For example, the TA adjustment information may include a TA value to be obtained after adjustment, or may include an adjustment amount, namely, a difference between a current TA value and the TA value to be obtained after adjustment. The network device may also send a TA adjustment command to the terminal device, to instruct the terminal device to perform TA adjustment. The network device may include, in the TA adjustment command, the TA information used by the terminal device to perform TA adjustment.

Specifically, if the network device receives the TA request information sent by the terminal device and then learns that the terminal device needs to perform TA adjustment, the network device determines the TA adjustment information of the terminal device and sends the TA information to the terminal device.

The TA information may be sent in a downlink on the grant-free transmission resource, or sent through a downlink control channel. That is, the network device may send the TA information to the terminal device on a grant-free transmission resource or a non-grant-free transmission resource. For example, the network device may send the TA information by using control signaling in a special format. The control signaling in the special format may indicate that the control signaling is used to adjust the TA of the terminal device, and the TA adjustment information of the terminal device may be directly carried in the control signaling. Alternatively, the network device may indicate, by using the control signaling, a resource location in which the TA information is located, so that the terminal device receives, based on the control signaling, the TA information on the resource location indicated by the control signaling.

As another embodiment, that the network device sends TA information to the terminal device in 530 includes: sending, by the network device, the TA information to the terminal device in a second subframe following a first subframe that is used to receive the TA request information, where an interval between the second subframe and the first subframe meets a preset interval.

Figure 7:
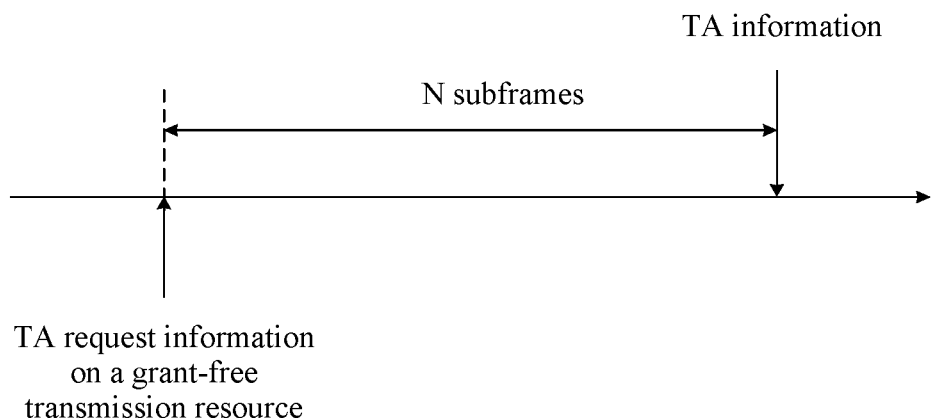
FIG. 7 is a schematic diagram of transmission of TA information according to an embodiment of this application.

For example, FIG. 7 is a schematic diagram of transmission of TA information according to an embodiment of this application. After sending the TA request information, the terminal device waits to receive the TA information from the network device, to perform TA adjustment of the terminal device. The network device may send the TA information in the second subframe following the first subframe in which the terminal device sends the TA request information. A quantity N of subframes between the second subframe and the first subframe may be defined by a protocol or configured by the network device. If the terminal device supports a self-contained (self-contained) subframe, the network device may also send the TA information on a next subframe after receiving the TA request information.

640: The terminal device receives the TA information sent by the network device.

650: The terminal device adjusts a TA of the terminal device based on the TA information.

After receiving the TA information sent by the network device, the terminal device obtains its own TA adjustment information, and may adjust its own TA based on the TA adjustment information.

In this way, the terminal device sends the TA request information on the grant-free transmission resource, so that when TA adjustment is required, the terminal device can obtain the TA adjustment information to effectively adjust the TA.

When the TA of the terminal device is about to exceed a CP length range due to a factor such as a location change or a network deployment environment change of the terminal device, the method in this embodiment of this application may be used, so that signal interference caused because the TA of the terminal device exceeds the CP length range can be avoided and the system may have a CP length as short as possible during CP design to improve spectral efficiency.

As another embodiment, before 610, namely, before the terminal device sends the TA request information to the network device on the grant-free transmission resource, the method further includes:

receiving, by the terminal device, grant information sent by the network device, where the grant information is used to indicate that the terminal device is capable of sending the TA request information to the network device on the grant-free transmission resource.

In other words, before a TA is sent, the network device needs to send the grant information to the terminal device, to notify the terminal device whether the terminal device supports sending the TA request information on the grant-free transmission resource. For example, the grant information may be sent to the terminal device by using a system message or dedicated RRC signaling. When the terminal device supports performing a TA request on the grant-free transmission resource, the terminal device can send the TA request information to the network device on the grant-free transmission resource, to perform TA adjustment.

In this case, after the network device sends the grant information to the terminal device, the terminal device determines that the terminal device can send the TA request information to the network device on the grant-free transmission resource, and actively determines, by using at least the foregoing three manners, when to send the TA request information.

Figure 8:
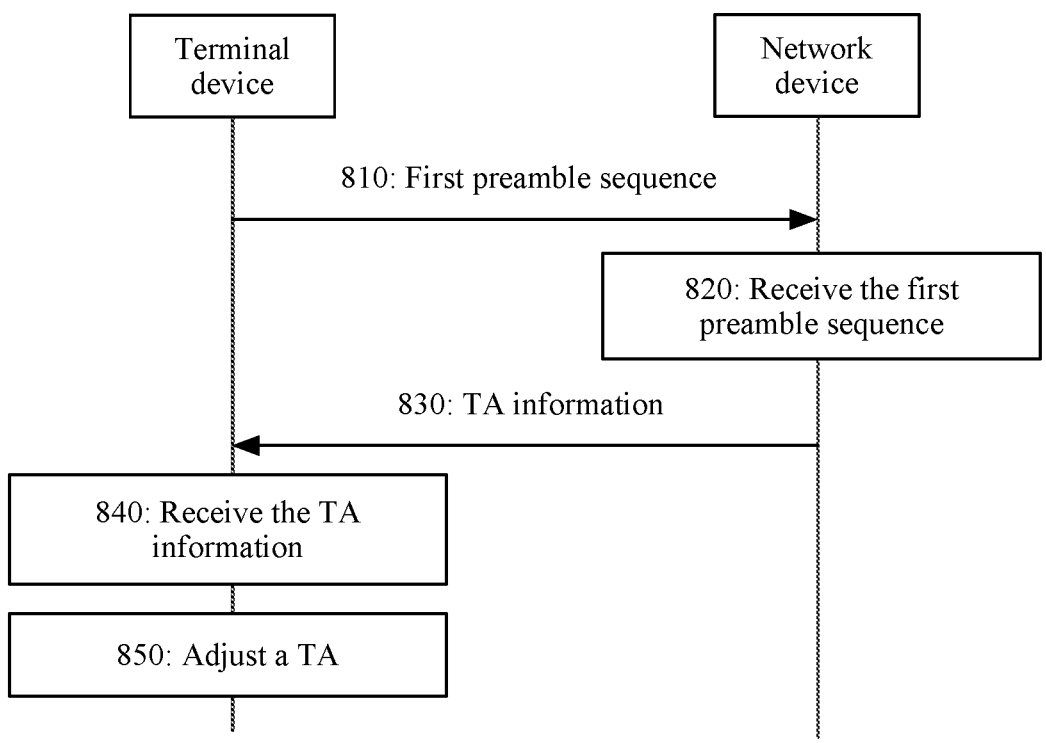
FIG. 8 is a process interaction diagram of a grant-free transmission method according to an embodiment of this application.

FIG. 8 is a process interaction diagram of a grant-free transmission method according to another embodiment of this application. As shown in FIG. 8, the grant-free transmission method includes the following steps.

810: A terminal device sends a first preamble sequence to a network device.

The first preamble sequence is used to indicate a piece of control information, for example, the control information is used to indicate that the terminal device request to obtain its own TA information.

Specifically, one or more preamble (Preamble) sequences may be reserved herein for a TA request of the terminal device. The network device may use a system message to configure one or more preamble sequences for a control instruction of a specific purpose, for example, perform broadcast by using a system message, or configure the preamble sequence by using a dedicated system message, or configure the preamble sequence by using RRC.

It should be understood that, the first preamble sequence may be configured by the network device and notified by the network device to the terminal device, or may be pre-agreed on by the network device and the terminal device, for example, stipulated in a protocol.

Optionally, before 810, the method may further include: sending, by the network device, sequence indication information to the terminal device, where the sequence indication information is used to indicate the first preamble sequence; and receiving, by the terminal device, the sequence indication information sent by the network device.

Specifically, the network device may notify the terminal device of the first preamble sequence that is used to indicate that the terminal device requests to obtain TA information for TA adjustment. After receiving the sequence indication information sent by the network device and obtaining the first preamble sequence, the terminal device saves the preamble sequence configured by the network device. When the terminal device needs to request for TA adjustment, the terminal device may send the first preamble sequence to the network device. If there are a plurality of preamble sequences used to request for TA adjustment, the terminal device may select one from the plurality of configured preamble sequences for sending. After receiving the first preamble sequence in 810, the network device may learn that the terminal device requests to obtain the TA information of the terminal device, and the network device may send the TA information to the terminal device.

820: The network device receives the first preamble sequence sent by the terminal device.

830: The network device sends TA information to the terminal device based on the first preamble sequence.

Specifically, after receiving the first preamble sequence sent by the terminal device, the network device may learn that the terminal device needs to obtain the TA information to perform TA adjustment, and further determine the TA information of the terminal device and send the TA information to the terminal device, so that the terminal device can perform TA adjustment in a timely manner.

It should be noted that, in this embodiment, the network device does not need to know which terminal device request to perform TA adjustment. If two different terminal devices select a same preamble sequence and a distance from one of the two terminal devices to the network device is greatly different from a distance from the other terminal device to the network device, a probability of successfully parsing the preamble sequence is usually very low, and the preamble sequence can be successfully parsed only when the distances from the two terminal devices to the network device are basically the same. When the distances from the two terminal devices to the network device are basically the same, TAs of the two terminal devices are less different. If the two different terminal devices select different preamble sequences, parsing usually succeeds.

Therefore, the network device may include identification information of the preamble sequence in the TA information, to indicate, in the sent TA information, a preamble sequence that is responded to, for differentiation between different preamble sequences.

840: The terminal device receives the TA information sent by the network device.

850: The terminal device adjusts a TA of the terminal device based on the TA information.

In the foregoing embodiment, the terminal device can actively determine whether the terminal device needs to perform TA adjustment, and when TA adjustment is required, request from the network device for TA adjustment. In some cases, locations of some terminal devices may be basically unchanged. However, due to a reason such as an oscillator drift, a TA may change after a specific period of time, and therefore the TA needs to be re-adjusted. For this type of terminal device, the network device may actively adjust the TA of the terminal device. To be specific, when the terminal device needs to perform TA adjustment, the network device may actively send the TA information to the terminal device, so that the terminal device performs TA adjustment. The following provides a detailed description with reference to FIG. 9.

Case 2:

The control information includes location information of the terminal device, and the feedback information includes location confirmation information sent by the network device based on the location information.

Figure 9:
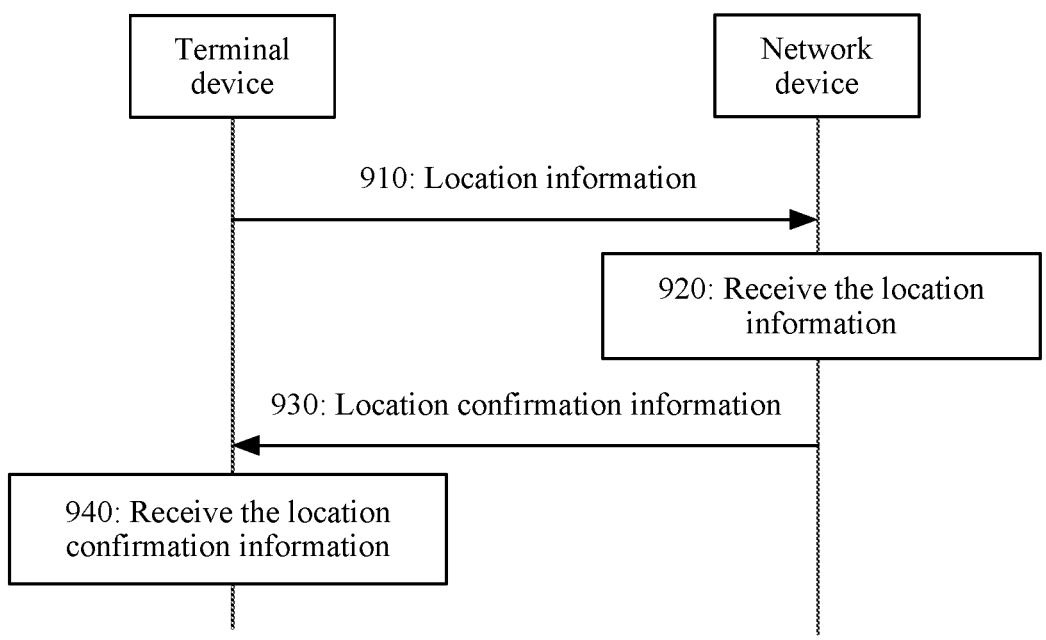
FIG. 9 is a process interaction diagram of a grant-free transmission method according to an embodiment of this application.

FIG. 9 is a process interaction diagram of a grant-free transmission method according to another embodiment of this application. FIG. 9 shows a network device and a terminal device. The network device may be, for example, the network device 10, the network device 30, or the network device 40 shown in FIG. 1. The terminal device may be, for example, the UE 20 shown in FIG. 1. Grant-free transmission may be performed between the terminal device and the network device in FIG. 9. By using the method in this embodiment of this application, the terminal device may perform data transmission with a plurality of network devices including the network device. For a method executed by another network device, refer to the method executed by the network device. For brevity, details are not described herein. As shown in FIG. 9, the grant-free transmission method includes the following steps.

910: The terminal device sends location information of the terminal device to the network device on a grant-free transmission resource.

Specifically, when moving in the network, the terminal device may send its own location information to the network device on the grant-free transmission resource, for example, a location notification message. This message is used to notify the network device of a current location of the terminal device. After receiving the location information sent by the terminal device, the network device may roughly determine an area in which the terminal device is located. When the terminal device has downlink data arrived, the network device may perform paging (paging) in a relatively small area, with no need to send a paging message in an entire tracking area (TA), where this tracking area may also be referred to as a routing area (Routing Area, RA). This can greatly reduce a quantity of paging messages. In addition, TA adjustment information sending or TA adjustment of the terminal device does not need to be frequently performed. In other words, after obtaining the location information of the terminal device, the network device can determine a specific TRP that can provide a service for the terminal device and that is in an area in which the terminal device is currently located, so that the terminal device needs to be paged only in the TRP instead of in the entire tracking area, thereby greatly reducing a signaling paging amount.

The location information may be control signaling. For example, the TA request information may be control signaling in a specific format, for example, a MAC CE, used to indicate that the control signaling is a location notification message. After receiving the location information, the network device may update the current location and an effective moving area of the terminal device. The effective moving area indicates a TRP cluster in which the terminal device may be located. The TRP cluster includes a group of TRPs. Further, the location information further includes an identifier of the terminal device.

Optionally, that the terminal device sends location information of the terminal device to the network device on a grant-free transmission resource in 910 may include:

determining, by the terminal device based on first status information of the terminal device, whether to send the location information of the terminal device to the network device; and sending, by the terminal device if the first status information meets a first condition, the location information to the network device on the grant-free transmission resource.

Optionally, the first status information includes at least one type of the following: a transmission time of the terminal device, a moving speed of the terminal device, a moving time of the terminal device, and a quantity of transmission reception points TRPs passed through by the terminal device in a moving process.

Specifically, the terminal device may actively determine, in a specific manner, whether the terminal device needs to send its own location information to the network device, and send its own location information to the network device when the location information needs to be sent, so that the network device obtains the location of the terminal device. The following uses three manners as an example to describe in detail how the terminal device determines whether to send its own location information to the network device, where the three manners are the transmission time of the terminal device, the moving speed and the moving time of the terminal device, and the quantity of TRPs passed through by the terminal device in a moving process.

Manner 1:

The terminal device may determine, based on transmission time information of the terminal device, whether to send the location information of the terminal device to the network device on the grant-free transmission resource.

The transmission time information indicates grant-free transmission duration of the terminal device, namely, duration of data transmission performed by the terminal device on the grant-free transmission resource.

For example, the terminal device may start a timer, and send the location information to the network device when the timer expires. In addition, the timer restarts counting every time the terminal device sends the location information. A time length set for the timer is a maximum time length in which the terminal device can continuously perform data transmission.

It may be understood that, in this embodiment, sending the location information by the terminal device is a type of periodic location notification. To be specific, the terminal device actively reports its own location information to the network device after data transmission is performed for a period of time.

In this way, the terminal device can periodically notify the network device of the location information of the terminal device, with no need to perform complex determining, so that the network device can obtain the location of the terminal device and determine a proper paging range based on the location of the terminal device, thereby effectively reducing a paging amount.

Manner 2:

The terminal device may determine, based on the moving speed and the moving time of the terminal device, whether to send the location information of the terminal device to the network device on the grant-free transmission resource.

Specifically, the terminal device may determine, based on the moving speed and the moving time of the terminal device, whether to send the location information, for example, send its own location information to the network device after the moving terminal device moves for a specific period of time, or send its own location information to the network device when the terminal device moves at a specific moving speed and a product obtained by multiplying the moving speed and the moving time exceeds a specific threshold.

In this way, when the terminal device is stationary or has a relatively low moving speed or a relatively short moving time, the terminal device does not need to send the location information frequently, to reduce power consumption of the terminal device. When the terminal device has a relatively high or low moving speed or a relatively long moving time and a location change is easily caused, the network device can obtain the location information of the terminal device in a timely manner, to avoid unnecessary signaling paging.

Manner 3:

The terminal device may determine, based on the quantity of TRPs passed through by the terminal device, whether to send the location information of the terminal device to the network device on the grant-free transmission resource.

In this embodiment, if the terminal device can identify a TRP, the terminal device may further determine, based on the quantity of TRPs passed through in a moving process, whether to perform location notification, that is, send its own location information to the network device. If the quantity of TRPs passed through by the terminal device in the moving process exceeds a specific quantity, the terminal device considers that location notification needs to be performed.

In this way, when the quantity of TRPs passed through by the terminal device is relatively small and a paging range changes little, location notification may not be performed. When the quantity of TRPs passed through by the terminal device is relatively large and a paging range may change greatly, the network device may obtain the location of the terminal device in a timely manner, and obtain, in a timely manner, a TRP range in which the terminal device needs to be paged.

920: The network device receives the location information of the terminal device sent by the terminal device.

Figure 10:
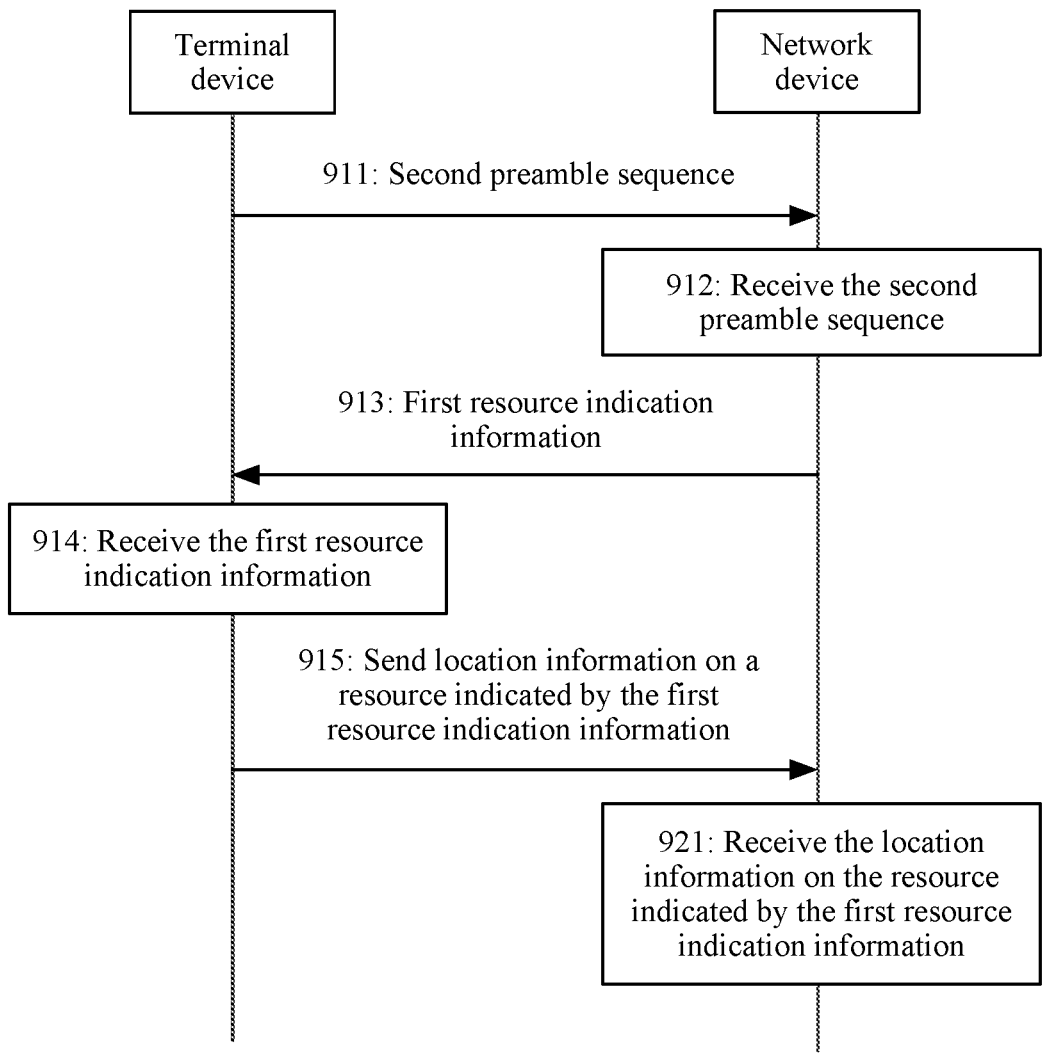
FIG. 10 is a process interaction diagram of a grant-free transmission method according to an embodiment of this application.

Optionally, in the grant-free transmission method according to another embodiment of this application shown in FIG. 10, before 910, namely, before the terminal device sends the location information of the terminal device to the network device on the grant-free transmission resource, the method may further include 911 to 915. In this case, 910 may be replaced by 915 and 920 may be replaced by 921.

911: The terminal device sends a second preamble sequence to the network device.

The second preamble sequence is used to indicate that the terminal device requests to send the location information of the terminal device to the network device.

Specifically, one or more preamble (Preamble) sequences may be reserved herein for indicating the location information of the terminal device. The network device may use a system message to configure one or more preamble sequences for a control instruction of a specific purpose, for example, perform broadcast by using a system message, or configure the preamble sequence by using a dedicated system message, or configure the preamble sequence by using RRC. Before the terminal device needs to send its own location information to the network device, the terminal device sends the second preamble sequence to the network device, to obtain an uplink transmission resource used to send the location information.

912: The network device receives the second preamble sequence sent by the terminal device.

913: The network device sends first resource indication information to the terminal device based on the second preamble sequence.

The first resource indication information indicates the uplink transmission resource used to send the location information.

Specifically, after receiving the second preamble sequence sent by the terminal device in 913, the network device learns that the terminal device needs to report the location information of the terminal device to the network device, so that the network device configures an uplink grant-free transmission resource used to send the location information for the terminal device, and indicates, to the terminal device by using the first resource indication information, the uplink transmission resource used to transmit the location information.

914: The terminal device receives the first resource indication information that is sent by the network device based on the second preamble sequence.

915: The terminal device sends the location information of the terminal device to the network device on an uplink transmission resource indicated by the first resource indication information.

921: The network device receives, on the uplink transmission resource, the location information sent by the terminal device.

It should be understood that, the second preamble sequence may be configured by the network device and notified by the network device to the terminal device, or may be pre-agreed on by the network device and the terminal device, for example, stipulated in a protocol.

930: The network device sends location confirmation information to the terminal device.

Specifically, after receiving the location information sent by the terminal device and learning a specific location of the terminal device, the network device returns the location confirmation information to the terminal device to indicate that the network device has received the location information, and determines, based on the received location information, a TRP area in which the terminal device is currently located, to determine a specific TRP range in which downlink paging needs to be performed on the terminal device.

The location confirmation (Confirm) information is used to indicate that the network device has received the location information sent by the terminal device. After completing sending of its own location information, the terminal device waits for the location confirmation information from the network device. The location confirmation message may be, for example, sent by the network device on a downlink grant-free transmission resource, or implemented by the network device by sending control signaling through a downlink control channel at a specific moment after the terminal device sends the location information. That is, the network device may send the location confirmation information to the terminal device on a grant-free transmission resource or a non-grant-free transmission resource. The control signaling itself may carry the location confirmation information or the control signaling is used to indicate a resource location in which the location confirmation information is located, so that the terminal device receives, on the specified resource location indicated by the control signaling, the location confirmation information sent by the network device.

As another embodiment, that the network device sends location confirmation information to the terminal device in 930 includes: sending, by the network device based on the location information, the location confirmation information to the terminal device in a second subframe following a first subframe that is used to receive the location information, where an interval between the second subframe and the first subframe meets a preset interval.

Figure 11:
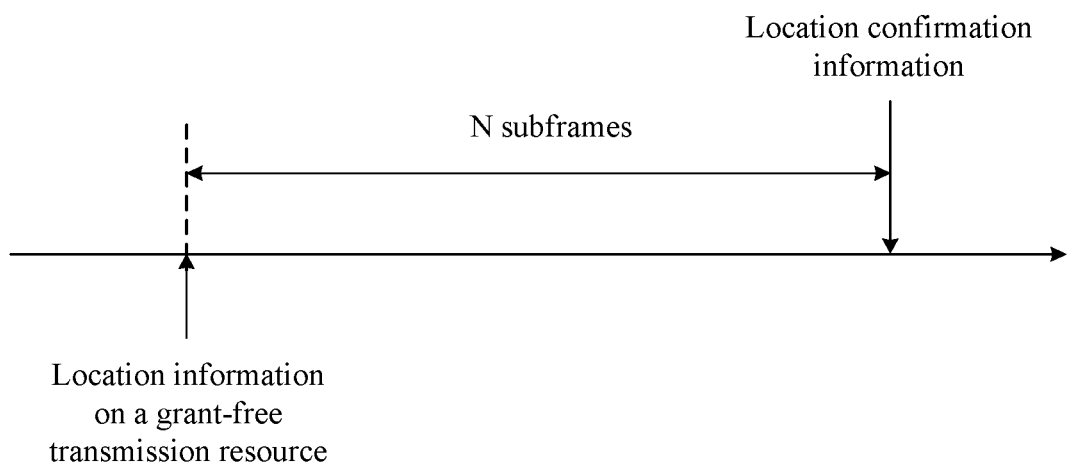
FIG. 11 is a process interaction diagram of a grant-free transmission method according to an embodiment of this application.

For example, FIG. 11 is a schematic diagram of transmission of location notification information according to an embodiment of this application. After sending its own location information, the terminal device waits to receive the location confirmation information from the network device. The network device may send the location confirmation information in the second subframe following the first subframe in which the terminal device sends the location information. A quantity N of subframes between the second subframe and the first subframe may be defined by a protocol or configured by the network device. If the terminal device supports a self-contained (self-contained) subframe, the network device may also send the location confirmation information on a next subframe after receiving the location information.

940: The terminal device receives the location confirmation information sent by the network device.

In this way, the terminal device sends its own location information on the grant-free transmission resource, so that the network device can obtain a location of the terminal device, to determine a paging range of the terminal device, thereby avoiding a relatively large paging amount caused by paging the terminal device in an entire cell.

When supporting grant-free transmission, the terminal device does not necessarily need to use the grant-free transmission in each case, and uses the grant-free transmission only when a size of data cached by the terminal device is smaller than a specific preset threshold. If a size of data cached in the grant-free transmission is greater than the threshold, the terminal device needs to enter a connected state for transmission. In this case, the terminal device may have no uplink resource. The terminal device may enter the connected state through a random access process. Alternatively, the terminal device transmits a buffer status report (Buffer Status Report, BSR) on the grant-free transmission resource to request the network device to allocate a resource to the terminal device, and enters the connected state.

Case 3:

The control information includes a buffer status report BSR, the feedback information includes second resource indication information sent by the network device based on the BSR, and the second resource indication information indicates an uplink transmission resource used to transmit uplink data of the terminal device, so that the terminal device sends the uplink data to the network device on the uplink transmission resource indicated by the second resource indication information.

Figure 12:
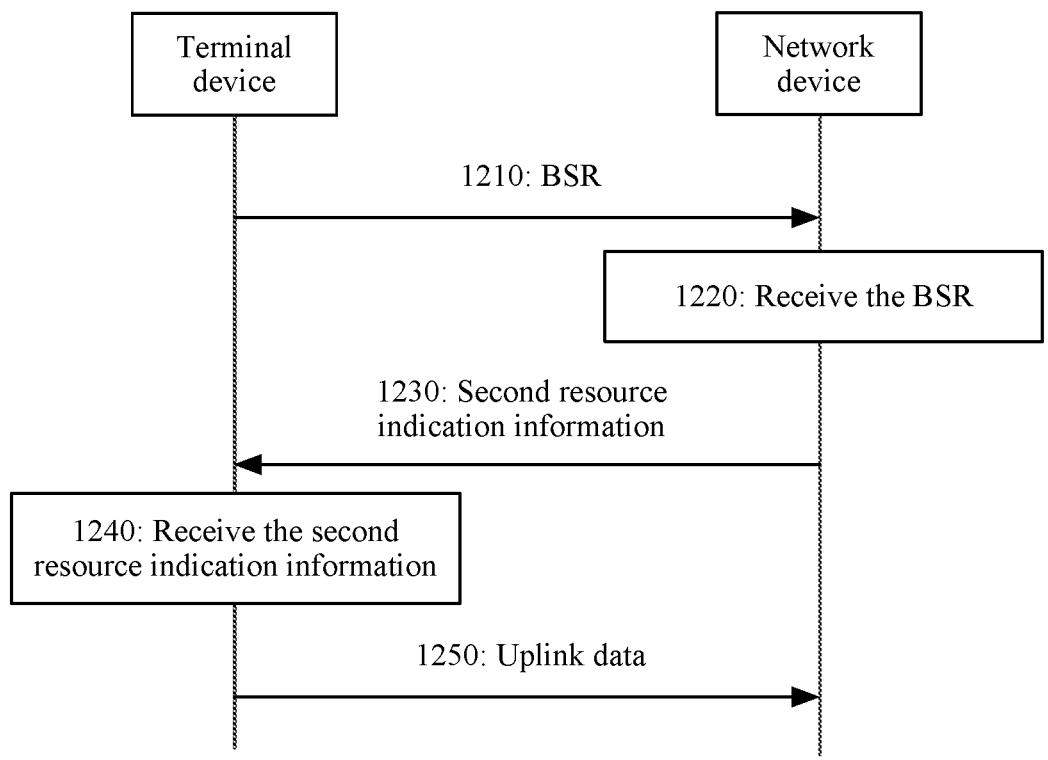
FIG. 12 is a schematic diagram of transmission of location notification information according to an embodiment of this application.

FIG. 12 is a process interaction diagram of a grant-free transmission method according to another embodiment of this application. Another type of signaling that can be transmitted on the grant-free transmission resource further includes a BSR. FIG. 12 shows a network device and a terminal device. The network device may be, for example, the network device 10, the network device 30, or the network device 40 shown in FIG. 1. The terminal device may be, for example, the UE 20 shown in FIG. 1. Grant-free transmission may be performed between the terminal device and the network device in FIG. 12. By using the method in this embodiment of this application, the terminal device may perform data transmission with a plurality of network devices including the network device. For a method executed by another network device, refer to the method executed by the network device. For brevity, details are not described herein. As shown in FIG. 12, the grant-free transmission method includes the following steps.

1210: The terminal device sends a buffer status report BSR to the network device on a grant-free transmission resource.

Specifically, the BSR is sent on the grant-free transmission resource. After receiving the BSR sent by the terminal device, the network device schedules an uplink transmission resource for the terminal device, and feeds back the uplink transmission resource in second resource indication information. In addition, the second resource indication information may further carry TA adjustment information of the terminal device, to adjust a TA of the terminal device.

Optionally, that the terminal device sends a buffer status report BSR to the network device on a grant-free transmission resource in 1210 includes: determining, by the terminal device, a size of uplink data of the terminal device; and when the terminal device determines that the size of the uplink data is greater than a first threshold, sending, by the terminal device, the BSR to the network device on the grant-free transmission resource.

1220: The network device receives, on the grant-free transmission resource, the buffer status report BSR sent by the terminal device.

1230: The network device sends second resource indication information to the terminal device based on the BSR.

The second resource indication information indicates an uplink transmission resource used to transmit the uplink data of the terminal device.

1240: The terminal device receives the second resource indication information that is sent by the network device based on the BSR.

Figure 13:
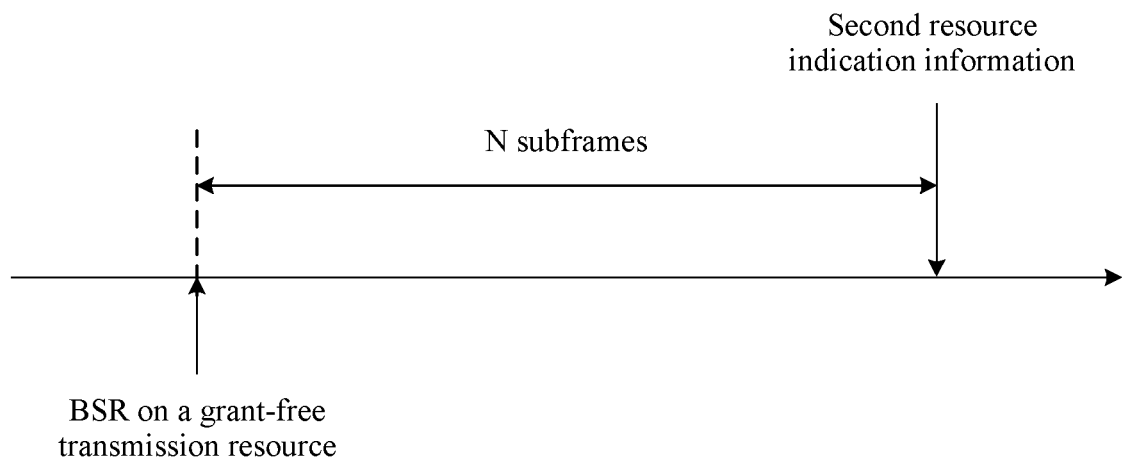
FIG. 13 is a process interaction diagram of a grant-free transmission method according to an embodiment of this application.

Similarly, FIG. 13 is a schematic diagram of transmission of second resource indication information according to an embodiment of this application. After sending the BSR, the terminal device waits for the network device to send the second resource indication information that indicates an uplink grant (UL grant) free transmission resource. The second resource indication information may be sent N subframes after the terminal device sends the BSR, and N may be defined by a protocol or configured by the network device and notified by the network device to the terminal device. The terminal device receives the second resource indication information. The second resource indication information may be sent on a grant-free transmission resource or a non-grant-free transmission resource, for example, implemented by sending downlink control signaling through a downlink control channel.

1250: The terminal device sends uplink data of the terminal device to the network device on an uplink transmission resource indicated by the second resource indication information.

In this way, the terminal device sends the BSR on the grant-free transmission resource to obtain the resource used to transmit the uplink data, so that when there is a large amount of cached data, the terminal device can transmit the data in the connected state.

The foregoing describes a case in which the terminal device actively sends control information to the network device to obtain a related transmission parameter. The following describes a case in which the network device actively adjusts a related transmission parameter of the terminal device such as a TA.

Figure 14:
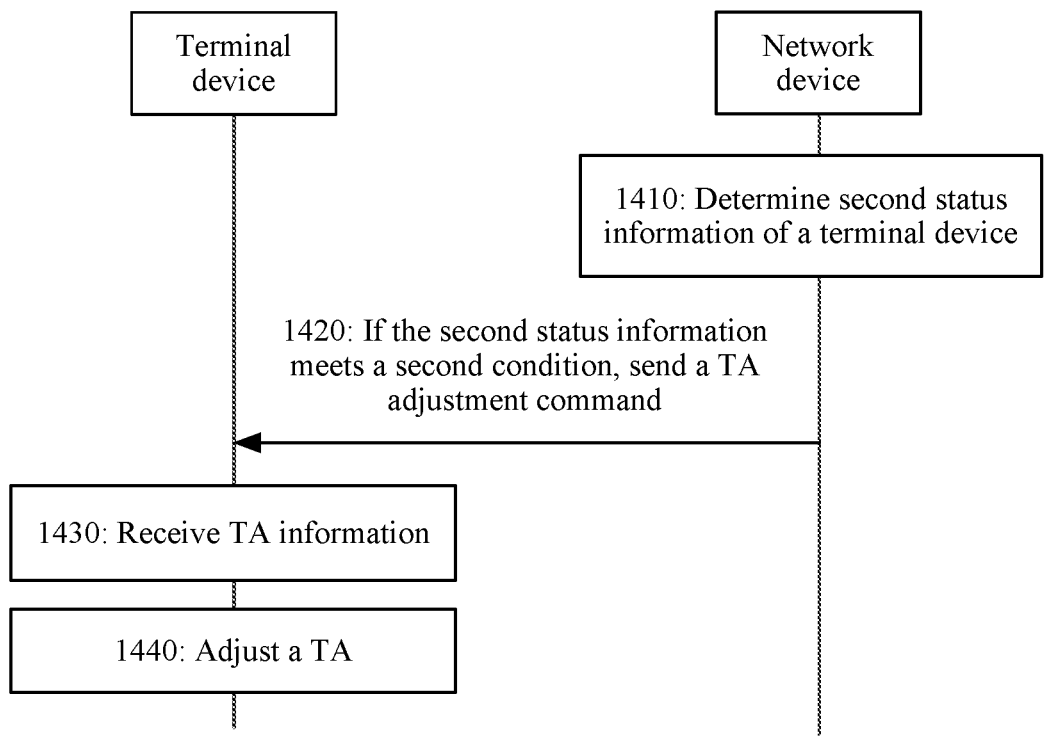
FIG. 14 is a schematic diagram of transmission of second resource indication information according to an embodiment of this application.

FIG. 14 is a process interaction diagram of a grant-free transmission method according to another embodiment of this application. As shown in FIG. 14, the grant-free transmission method includes the following steps.

1410: A network device determines second status information of a terminal device for grant-free transmission.

1420: If the second status information meets a second condition, the network device sends TA information to the terminal device.

Optionally, the second status information includes a quantity of data transmission times of the terminal device and/or a data transmission time of the terminal device. For example, the second condition may be that a value indicated by the second status information reaches a preset threshold.

The transmission time information indicates data transmission duration of the terminal device on a grant-free transmission resource.

Specifically, the network device may configure a corresponding second condition for the terminal device based on a feature of the terminal device such as oscillator precision. For example, every time the terminal device performs data transmission, the network device may perform TA adjustment for the terminal device once. After completing data transmission once, the terminal device waits for the TA information from the network device. Alternatively, the network device configures a maximum quantity of transmission times based on a data transmission frequency of the terminal device, to be specific, how many times of transmission are performed by the terminal device before the TA needs to be adjusted once, and the network device may send the TA information to the terminal device when a quantity of times of data transmission performed by the terminal device on the grant-free transmission resource reaches the maximum quantity of transmission times. Alternatively, the network may configure a timer for the terminal, and when the timer expires, the network device sends the TA information to the terminal device.

Optionally, the TA information may be sent together with acknowledgement (Acknowledgement, ACK) feedback or negative acknowledgement (Negative Acknowledgement, NACK) feedback of the network device, or sent separately, which depends on whether the ACK/NACK feedback is supported.

Optionally, before the network device sends the TA information to the terminal device, the method may further include: determining, by the network device, the second condition, and sending information about the second condition to the terminal device.

1430: The terminal device receives the TA information sent by the network device.

Optionally, before the terminal device receives the TA information sent by the network device, the method may further include: receiving, by the terminal device, the information about the second condition sent by the network device.

1440: The terminal device adjusts a TA of the terminal device based on the TA information.

Therefore, by using status information of the terminal device for data transmission, the network device can actively send the TA information to the terminal device when the terminal device requires TA adjustment, so that the terminal device adjusts the TA.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The following describes a terminal device and a network device for grant-free transmission according to the embodiments of this application with reference to FIG. 15 to FIG. 23. The technical features described in the foregoing method embodiments are applicable to the following apparatus embodiments.

Figure 15:
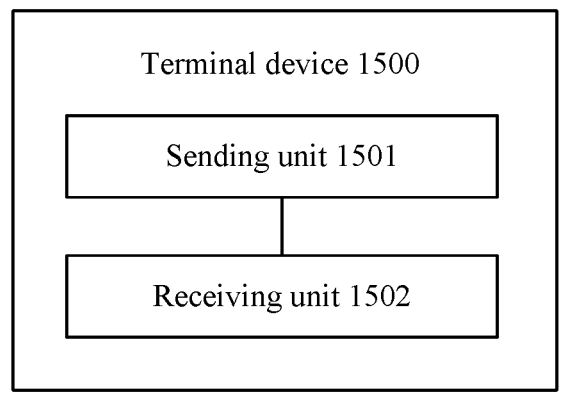
FIG. 15 is a structural block diagram of a terminal device according to an embodiment of this application.

FIG. 15 shows a network device 1500 according to an embodiment of this application. As shown in FIG. 15, the terminal device 1500 includes:

a sending unit 1501, configured to send control information to a network device on a grant-free transmission resource; and a receiving unit 1502, configured to receive feedback information that is sent by the network device based on the control information sent by the transmitter.

In this way, the terminal device sends the control information to the network device on the grant-free transmission resource, so that in a data transmission process, the terminal device can obtain a transmission parameter or resource information and properly adjust the transmission process of the terminal device in a timely manner.

Optionally, before the sending unit 1501 sends the control information to the network device on the grant-free transmission resource, the receiving unit 1502 is further configured to: receive grant information sent by the network device, where the grant information is used to indicate that the terminal device is capable of sending the control information to the network device on the grant-free transmission resource.

Optionally, the sending unit 1501 is specifically configured to: determine, based on first status information of the terminal device, whether to send the control information to the network device; and send, by the transmitter if the first status information meets a first condition, the control information to the network device on the grant-free transmission resource.

Optionally, the receiving unit 1502 is specifically configured to: receive, in a second subframe following a first subframe that is used to send the control information, the feedback information that is sent by the network device based on the control information, where an interval between the second subframe and the first subframe meets a preset interval.

Optionally, the control information includes timing advance TA request information, and the feedback information includes TA information sent by the network device based on the TA request information.

Optionally, the first status information includes at least one type of the following information: a transmission time of the terminal device, a link loss of the terminal device, a moving speed of the terminal device, and a moving time of the terminal device.

Optionally, the sending unit 1501 is specifically configured to: send a first preamble sequence to the network device on the grant-free transmission resource, where the first preamble sequence is used to indicate that the terminal device requests for TA information of the terminal device; and the receiving unit 1502 is specifically configured to: receive the TA information that is sent by the network device based on the first preamble sequence.

Optionally, the control information includes location information of the terminal device, and the feedback information includes location confirmation information sent by the network device based on the location information.

Optionally, the first status information includes at least one type of the following information: a transmission time of the terminal device, a moving speed of the terminal device, a moving time of the terminal device, and a quantity of transmission reception points TRPs passed through by the terminal device in a moving process.

Optionally, the control information includes a buffer status report BSR, the feedback information includes second resource indication information sent by the network device based on the BSR, and the second resource indication information indicates an uplink transmission resource used to transmit uplink data of the terminal device; and the sending unit 1501 is specifically configured to: send the uplink data to the network device on the uplink transmission resource indicated by the second resource indication information.

Optionally, the first status information includes a size of to-be-transmitted uplink data of the terminal device; and the sending unit 1501 is specifically configured to: if the size of the to-be-transmitted uplink data is greater than a first threshold, send, by the terminal device, the BSR to the network device on the grant-free transmission resource.

Figure 16:
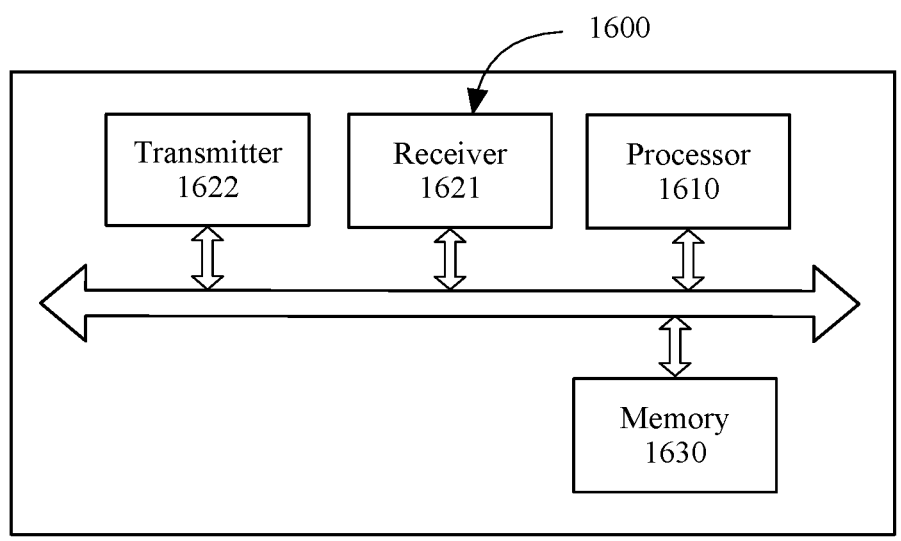
FIG. 16 is a structural block diagram of a terminal device according to an embodiment of this application.

It should be noted that, in this embodiment of this application, the sending unit 1501 may be implemented by a transmitter and the receiving unit 1502 may be implemented by a receiver. As shown in FIG. 16, a terminal device 1600 may include a processor 1610, a transceiver 1620, and a memory 1630. The transceiver 1620 may include a receiver 1621 and a transmitter 1622, and the memory 1630 may be configured to store code to be executed by the processor 1610, and the like. Components in the terminal device 1600 are interconnected through an internal connection path.

The transmitter 1622 is configured to send control information to a network device on a grant-free transmission resource; and the receiver 1621 is configured to receive feedback information that is sent by the network device based on the control information sent by the transmitter.

Optionally, before the transmitter 1622 sends the control information to the network device on the grant-free transmission resource, the receiver 1621 is further configured to: receive grant information sent by the network device, where the grant information is used to indicate that the terminal device is capable of sending the control information to the network device on the grant-free transmission resource.

Optionally, the transmitter 1622 is specifically configured to: determine, based on first status information of the terminal device, whether to send the control information to the network device; and send, by the transmitter 1622 if the first status information meets a first condition, the control information to the network device on the grant-free transmission resource.

Optionally, the receiver 1621 is specifically configured to: receive, in a second subframe following a first subframe that is used to send the control information, the feedback information that is sent by the network device based on the control information, where an interval between the second subframe and the first subframe meets a preset interval.

Optionally, the control information includes timing advance TA request information, and the feedback information includes TA information sent by the network device based on the TA request information.

Optionally, the first status information includes at least one type of the following information: a transmission time of the terminal device, a link loss of the terminal device, a moving speed of the terminal device, and a moving time of the terminal device.

Optionally, the transmitter 1622 is specifically configured to: send a first preamble sequence to the network device on the grant-free transmission resource, where the first preamble sequence is used to indicate that the terminal device requests to obtain TA information of the terminal device; and the receiver 1621 is specifically configured to: receive the TA information that is sent by the network device based on the first preamble sequence.

Optionally, the control information includes location information of the terminal device, and the feedback information includes location confirmation information sent by the network device based on the location information.

Optionally, the first status information includes at least one type of the following information: a transmission time of the terminal device, a moving speed of the terminal device, a moving time of the terminal device, and a quantity of transmission reception points TRPs passed through by the terminal device in a moving process.

Optionally, the control information includes a buffer status report BSR, the feedback information includes second resource indication information sent by the network device based on the BSR, and the second resource indication information indicates an uplink transmission resource used to transmit uplink data of the terminal device; and the transmitter 1622 is specifically configured to: send the uplink data to the network device on the uplink transmission resource indicated by the second resource indication information.

Optionally, the first status information includes a size of to-be-transmitted uplink data of the terminal device; and the transmitter 1622 is specifically configured to: if the size of the to-be-transmitted uplink data is greater than a first threshold, send, by the terminal device, the BSR to the network device on the grant-free transmission resource.

Figure 17:
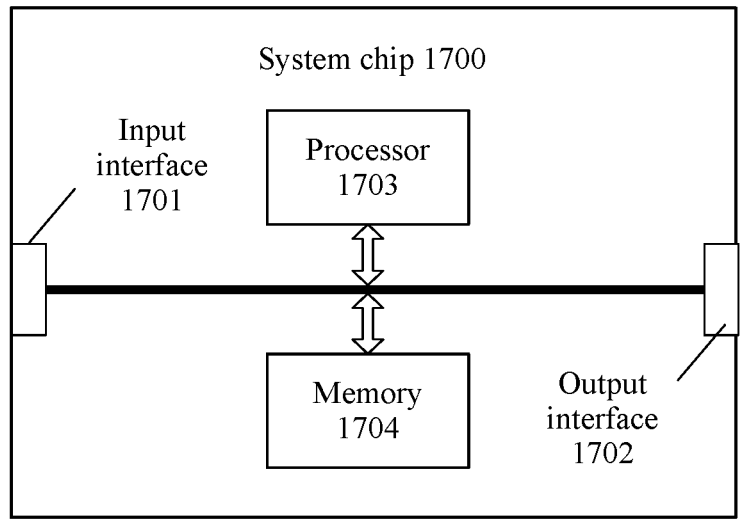
FIG. 17 is a schematic structural diagram of a system chip according to an embodiment of this application.

FIG. 17 is a schematic structural diagram of a system chip according to an embodiment of this application. A system chip 1700 in FIG. 17 includes an input interface 1701, an output interface 1702, at least one processor 1703, and a memory 1704. The input interface 1701, the output interface 1702, the processor 1703, and the memory 1704 are interconnected through an internal connection path. The processor 1703 is configured to execute code in the memory 1704. When the code is executed, the processor 1703 implements the method executed by the terminal device in FIG. 5 to FIG. 14.

The terminal device 1500 shown in FIG. 15 or the network device 1600 shown in FIG. 16 or the system chip 1700 shown in FIG. 17 can implement processes implemented by the terminal device in the method embodiments in FIG. 5 to FIG. 14. To avoid repetition, details are not described herein.

Figure 18:
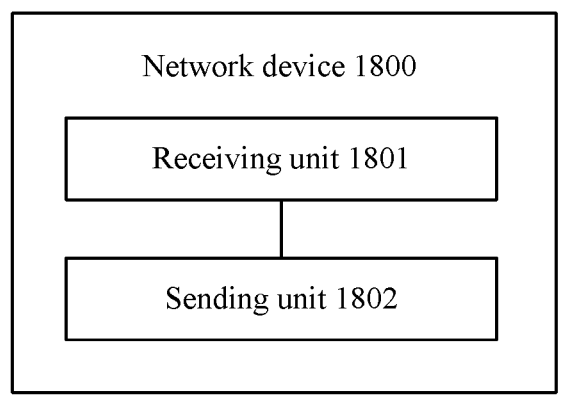
FIG. 18 is a structural block diagram of a network device according to an embodiment of this application.

FIG. 18 shows a network device 1800 according to an embodiment of this application. As shown in FIG. 18, the network device 1800 includes:

a receiving unit 1801, configured to receive, on a grant-free transmission resource, control information sent by a terminal device; and a sending unit 1802, configured to send feedback information to the terminal device based on the control information.

Therefore, the network device receives, on the grant-free transmission resource, the control information sent by the terminal device, and returns the feedback information specific to the control information to the terminal device, so that in a data transmission process, the terminal device can obtain a transmission parameter or information and properly adjust the transmission process of the terminal device in a timely manner.

Optionally, before the receiving unit 1801 receives, on the grant-free transmission resource, the control information sent by the terminal device, the sending unit 1802 is further configured to:

send grant information to the terminal device, where the grant information is used to indicate that the terminal device is capable of sending the control information to the network device on the grant-free transmission resource.

Optionally, the sending unit 1802 is specifically configured to: send the feedback information to the terminal device in a second subframe following a first subframe that is used to receive the control information, where an interval between the second subframe and the first subframe meets a preset interval.

Optionally, the control information includes timing advance TA request information, and the feedback information includes TA information sent by the network device based on the TA request information.

Optionally, the receiving unit 1801 is specifically configured to: receive, on the grant-free transmission resource, a first preamble sequence sent by the terminal device, where the first preamble sequence is used to indicate that the terminal device requests to obtain TA information of the terminal device; and the sending unit 1802 is specifically configured to: send the feedback information to the terminal device based on the first preamble sequence.

Optionally, the control information includes location information of the terminal device, and the feedback information includes location confirmation information sent by the network device based on the location information.

Optionally, the control information includes a buffer status report BSR, the feedback information includes second resource indication information sent by the network device based on the BSR, and the second resource indication information indicates an uplink transmission resource used to transmit uplink data of the terminal device; and the receiving unit 1801 is further configured to: receive, by the network device on the uplink transmission resource indicated by the second resource indication information, the uplink data sent by the terminal device.

Figure 19:
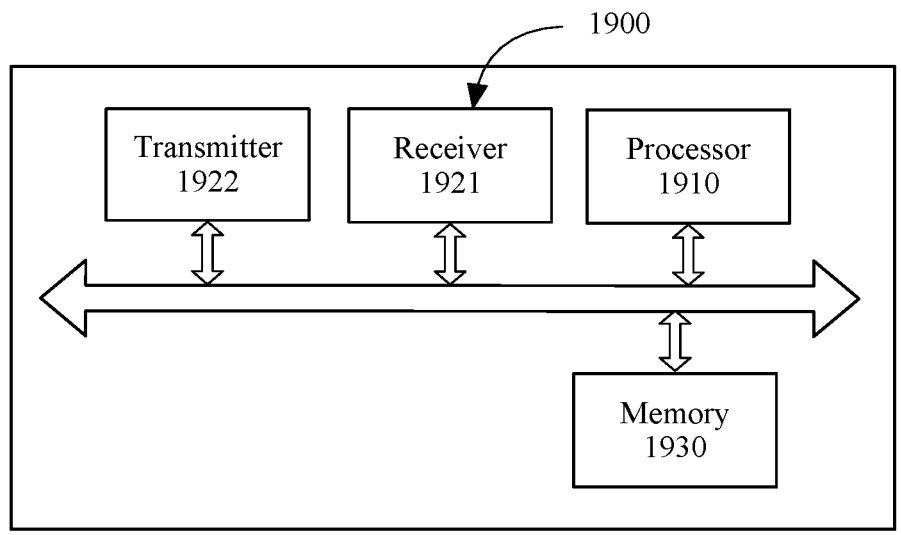
FIG. 19 is a structural block diagram of a network device according to an embodiment of this application.

It should be noted that, in this embodiment of this application, the receiving unit 1801 may be implemented by a receiver and the sending unit 1802 may be implemented by a transmitter. As shown in FIG. 19, a network device 1900 may include a processor 1910, a transceiver 1920, and a memory 1930. The transceiver 1920 may include a receiver 1921 and a transmitter 1922, and the memory 1930 may be configured to store code to be executed by the processor 1910, and the like. Components in the network device 1900 are interconnected through an internal connection path.

The receiver 1921 is configured to receive, on a grant-free transmission resource, control information sent by a terminal device; and the transmitter 1922 is configured to send feedback information to the terminal device based on the control information.

Optionally, before the receiver 1921 receives, on the grant-free transmission resource, the control information sent by the terminal device, the transmitter 1922 is further configured to:

send grant information to the terminal device, where the grant information is used to indicate that the terminal device is capable of sending the control information to the network device on the grant-free transmission resource.

Optionally, the transmitter 1922 is specifically configured to: send the feedback information to the terminal device in a second subframe following a first subframe that is used to receive the control information, where an interval between the second subframe and the first subframe meets a preset interval.

Optionally, the control information includes timing advance TA request information, and the feedback information includes TA information sent by the network device based on the TA request information.

Optionally, the receiver 1921 is specifically configured to: receive, on the grant-free transmission resource, a first preamble sequence sent by the terminal device, where the first preamble sequence is used to indicate the control information.

Optionally, the control information includes location information of the terminal device, and the feedback information includes location confirmation information sent by the network device based on the location information.

Optionally, the control information includes a buffer status report BSR, the feedback information includes second resource indication information sent by the network device based on the BSR, and the second resource indication information indicates an uplink transmission resource used to transmit uplink data of the terminal device; and the receiver 1921 is further configured to: receive, on the uplink transmission resource indicated by the second resource indication information, the uplink data sent by the terminal device.

Figure 20:
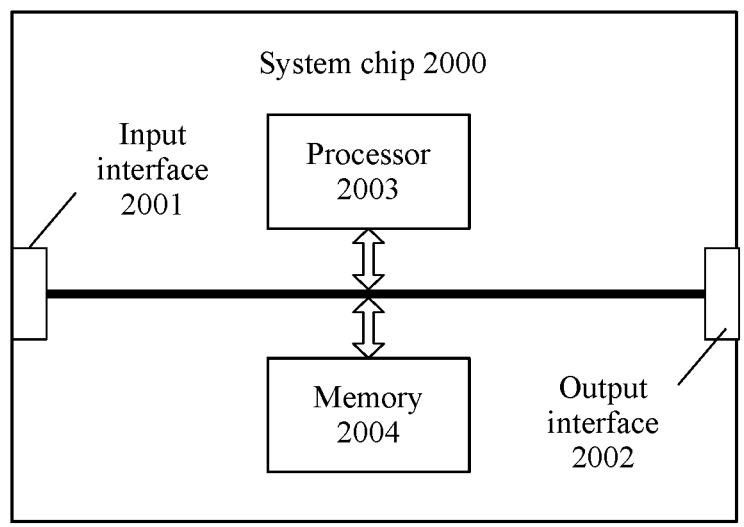
FIG. 20 is a schematic structural diagram of a system chip according to an embodiment of this application.

FIG. 20 is a schematic structural diagram of a system chip according to an embodiment of this application. A system chip 2000 in FIG. 20 includes an input interface 2001, an output interface 2002, at least one processor 2003, and a memory 2004. The input interface 2001, the output interface 2002, the processor 2003, and the memory 2004 are interconnected through an internal connection path.

The network device 1800 shown in FIG. 18 or the network device 1900 shown in FIG. 19 or the system chip 2000 shown in FIG. 20 can implement processes implemented by the network device in the method embodiments in FIG. 5 to FIG. 14. To avoid repetition, details are not described herein.

Figure 21:
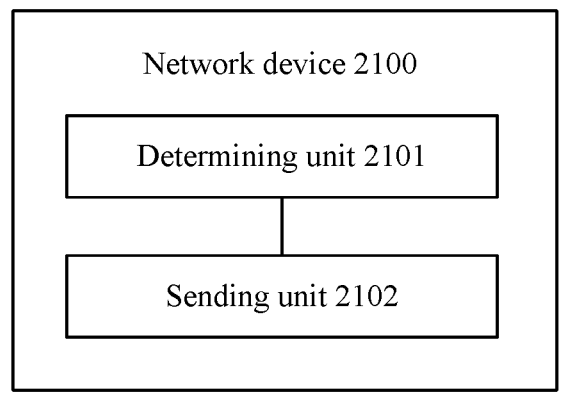
FIG. 21 is a structural block diagram of a network device according to an embodiment of this application.

FIG. 21 shows a network device 2100 according to an embodiment of this application. As shown in FIG. 21, the network device 2100 includes:

a determining unit 2101, configured to determine second status information of a terminal device specific to data transmission on a grant-free transmission resource; and a sending unit 2102, configured to send, when the determining unit 2101 determines that the second status information meets a second condition, TA information to the terminal device.

Therefore, by using status information of the terminal device for data transmission, the network device can actively send the TA information to the terminal device when the terminal device requires TA adjustment, so that the terminal device adjusts a TA.

Optionally, the second status information includes a quantity of data transmission times of the terminal device, where if the second status information meets a second condition, the sending unit 2102 is specifically configured to: if the quantity of data transmission times reaches a threshold of a quantity of transmission times, send, by the network device, the TA information to the terminal device.

Optionally, the second status information includes a data transmission time of the terminal device, where if the second status information meets a second condition, the sending unit 2102 is specifically configured to: if the data transmission time reaches a transmission time threshold, send, by the network device, the TA information to the terminal device.

Figure 22:
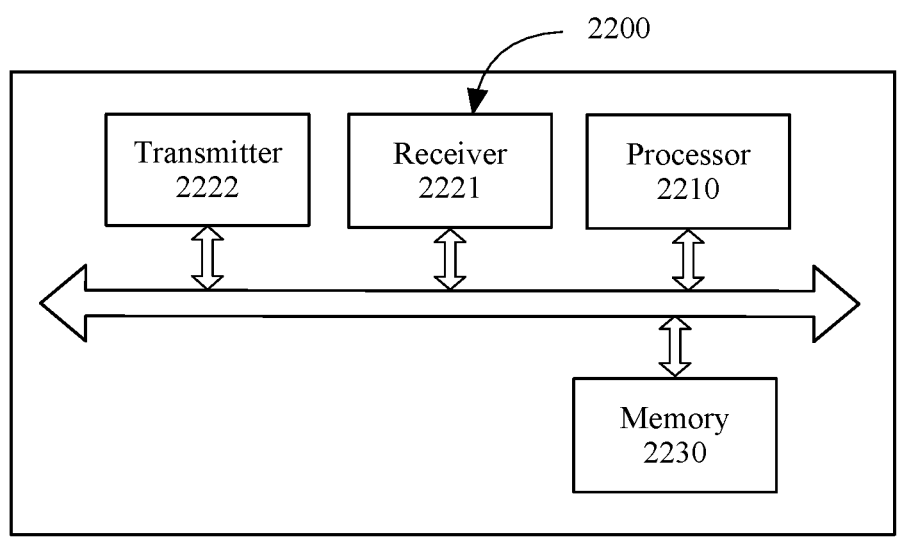
FIG. 22 is a structural block diagram of a network device according to an embodiment of this application.

It should be noted that, in this embodiment of this application, the determining unit 2101 may be implemented by a processor and the sending unit 2102 may be implemented by a transmitter. As shown in FIG. 22, a network device 2200 may include a processor 2210, a transceiver 2220, and a memory 2230. The transceiver 2220 may include a receiver 2221 and a transmitter 2222, and the memory 2230 may be configured to store code to be executed by the processor 2210, and the like. Components in the network device 2200 are interconnected through an internal connection path.

The processor 2210 is configured to determine second status information of a terminal device specific to data transmission on a grant-free transmission resource; and the transmitter 2222 is configured to send, when the processor 2210 determines that the second status information meets a second condition, TA information to the terminal device.

Optionally, the second status information includes a quantity of data transmission times of the terminal device, where if the second status information meets a second condition, the transmitter 2222 is specifically configured to: if the quantity of data transmission times reaches a threshold of a quantity of transmission times, send, by the network device, the TA information to the terminal device.

Optionally, the second status information includes a data transmission time of the terminal device, where if the second status information meets a second condition, the transmitter 2222 is specifically configured to: if the data transmission time reaches a transmission time threshold, send, by the network device, the TA information to the terminal device.

Figure 23:
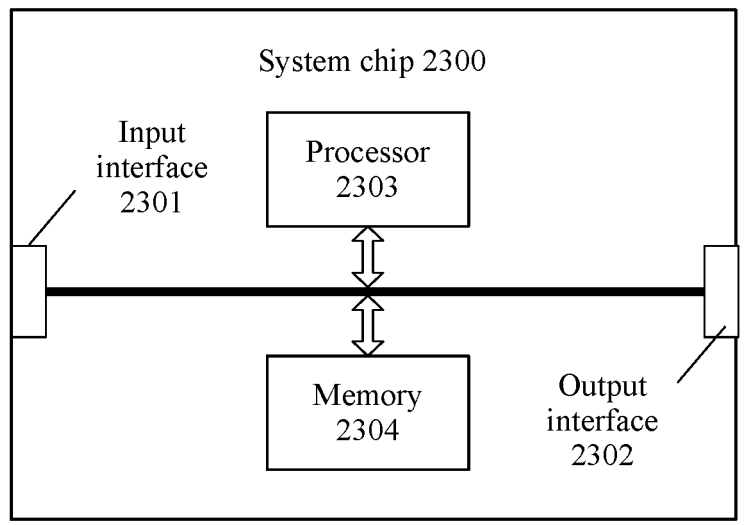
FIG. 23 is a schematic structural diagram of a system chip according to an embodiment of this application.

FIG. 23 is a schematic structural diagram of a system chip according to an embodiment of this application. A system chip 2300 in FIG. 23 includes an input interface 2301, an output interface 2302, at least one processor 2303, and a memory 2304. The input interface 2301, the output interface 2302, the processor 2303, and the memory 2304 are interconnected through an internal connection path. The processor 2303 is configured to execute code in the memory 2304. When the code is executed, the processor 2303 implements the method executed by the network device in FIG. 5 to FIG. 14.

The network device 2100 shown in FIG. 21 or the network device 2200 shown in FIG. 22 or the system chip 2300 shown in FIG. 23 can implement processes implemented by the network device in the method embodiments in FIG. 5 to FIG. 14. To avoid repetition, details are not described herein.

Figure 24:
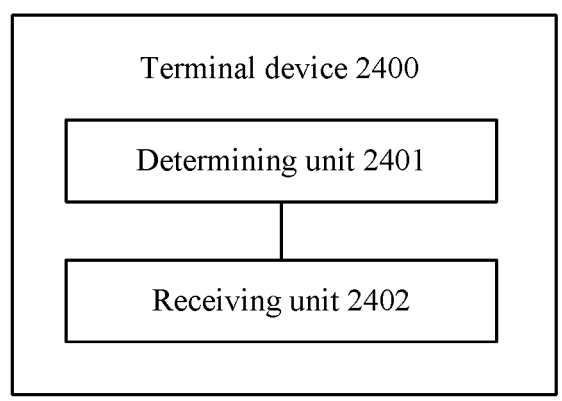
FIG. 24 is a structural block diagram of a terminal device according to an embodiment of this application.

FIG. 24 shows a terminal device 2400 according to an embodiment of this application. As shown in FIG. 24, the network device 2400 includes:

a determining unit 2401, configured to determine second status information of the terminal device specific to data transmission on a grant-free transmission resource; and a receiving unit 2402, configured to receive, when the second status information meets a second condition, TA information sent by a network device.

Therefore, when the terminal device meets a condition for TA adjustment, the network device can actively send the TA information to the terminal device, so that the terminal device adjusts a TA based on the TA information.

Optionally, the second status information includes a quantity of data transmission times of the terminal device, where the receiving unit 2402 is specifically configured to: if the quantity of data transmission times reaches a threshold of a quantity of transmission times, receive the TA information sent by the network device.

Optionally, the second status information includes a data transmission time of the terminal device, where the receiving unit 2402 is specifically configured to: if the data transmission time reaches a transmission time threshold, receive the TA information sent by the network device.

Figure 25:
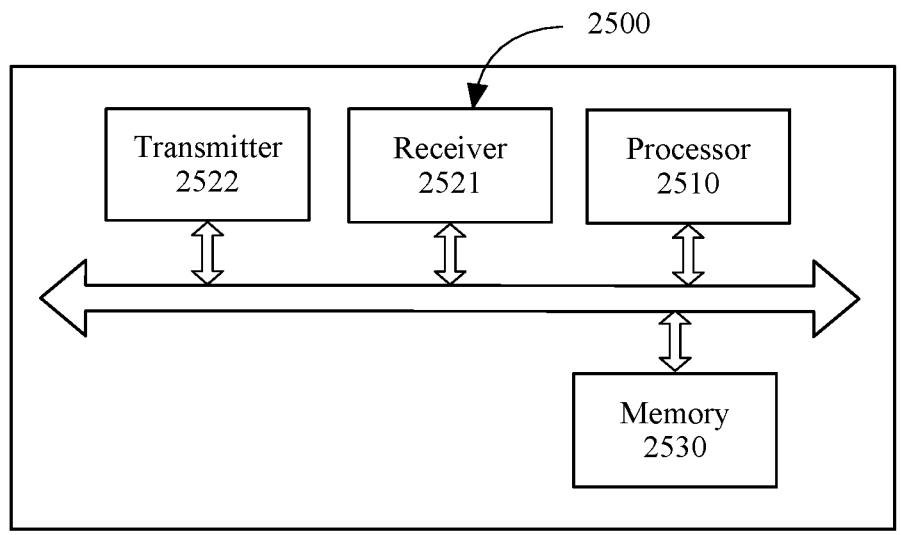
FIG. 25 is a structural block diagram of a terminal device according to an embodiment of this application.

It should be noted that, in this embodiment of this application, the determining unit 2401 may be implemented by a processor and the receiving unit 2402 may be implemented by a transmitter. As shown in FIG. 25, a network device 2500 may include a processor 2510, a transceiver 2520, and a memory 2530. The transceiver 2520 may include a receiver 2521 and a transmitter 2522, and the memory 2530 may be configured to store code to be executed by the processor 2510, and the like. Components in the network device 2500 are interconnected through an internal connection path.

The processor 2510 is configured to determine second status information of the terminal device specific to data transmission on a grant-free transmission resource; and the transmitter 2525 is configured to receive, when the processor 2510 determines that the second status information meets a second condition, TA information sent by a network device.

Optionally, the second status information includes a quantity of data transmission times of the terminal device, where the transmitter 2525 is specifically configured to: if the quantity of data transmission times reaches a threshold of a quantity of transmission times, receive the TA information sent by the network device.

Optionally, the second status information includes a data transmission time of the terminal device, where the transmitter 2522 is specifically configured to: if the data transmission time reaches a transmission time threshold, receive the TA information sent by the network device.

Figure 26:
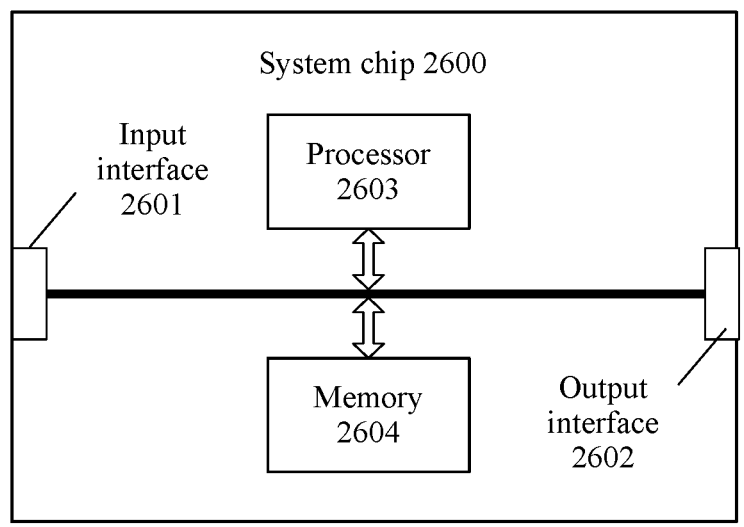
FIG. 26 is a schematic structural diagram of a system chip according to an embodiment of this application.

FIG. 26 is a schematic structural diagram of a system chip according to an embodiment of this application. A system chip 2600 in FIG. 26 includes an input interface 2601, an output interface 2602, at least one processor 2603, and a memory 2604. The input interface 2601, the output interface 2602, the processor 2603, and the memory 2604 are interconnected through an internal connection path. The processor 2603 is configured to execute code in the memory 2604. When the code is executed, the processor 2603 implements the method executed by the terminal device in FIG. 5 to FIG. 14.

The terminal device 2300 shown in FIG. 23 or the terminal device 2400 shown in FIG. 24 or the system chip 2500 shown in FIG. 25 can implement processes implemented by the terminal device in the method embodiments in FIG. 5 to FIG. 14. To avoid repetition, details are not described herein.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A grant-free transmission method, wherein the method comprises:
    determining, by a terminal, a moving speed of the terminal and a moving time of the terminal;
    multiplying, by the terminal, the moving speed of the terminal and the moving time of the terminal to produce a product;
    determining, by the terminal, whether the product exceeds a threshold;
    sending, by a terminal device, control information to a network device on a grant-free transmission resource; and
    receiving, by the terminal device, feedback information that is sent by the network device based on the control information,
    wherein when the product exceeds the threshold the control information comprises timing advance (TA) request information, and the feedback information comprises TA information sent by the network device based on the TA request information.

2. The method according to claim 1, wherein the method further comprises:
receiving, by the terminal device, capability information sent by the network device, wherein the capability information is used to indicate that the network device is capable of receiving, on the grant-free transmission resource, the control information sent by the terminal device.

3. The method according to claim 1, wherein the receiving, by the terminal device, feedback information that is sent by the network device based on the control information comprises:
receiving, by the terminal device in a second subframe following a first subframe that is used to send the control information, the feedback information that is sent by the network device based on the control information, wherein an interval between the second subframe and the first subframe meets a preset interval.

4. The method according to claim 1, wherein the sending, by a terminal device, control information to a network device on a grant-free transmission resource comprises:
determining, by the terminal device based on first status information of the terminal device, whether to send the control information to the network device; and
sending, by the terminal device if the first status information meets a first condition, the control information to the network device on the grant-free transmission resource.

5. The method according to claim 4, wherein the first status information comprises at least one type of the following information:
a transmission time of the terminal device, a link loss of the terminal device, a moving speed of the terminal device, and a moving time of the terminal device.

6. The method according to claim 4, wherein the control information comprises location information of the terminal device, and the feedback information comprises location confirmation information sent by the network device based on the location information.

7. The method according to claim 6, wherein the first status information comprises at least one type of the following information:
a transmission time of the terminal device, a moving speed of the terminal device, a moving time of the terminal device, and a quantity of transmission reception points (TRPs) passed through by the terminal device in a moving process.

8. The method according to claim 6, wherein before the sending, by a terminal device, control information to a network device on a grant-free transmission resource, the method further comprises:
sending, by the terminal device, a second preamble sequence to the network device, wherein the second preamble sequence is used to indicate that the terminal device requests to send the location information to the network device; and
receiving, by the terminal device, first resource indication information that is sent by the network device based on the second preamble sequence, wherein the first resource indication information indicates an uplink grant-free transmission resource used to send the location information; and
the sending, by a terminal device, control information to a network device on a grant-free transmission resource comprises:

sending, by the terminal device, the location information to the network device on the uplink grant-free transmission resource indicated by the first resource indication information.

9. The method according to claim 4, wherein the control information comprises a buffer status report (BSR), the feedback information comprises second resource indication information sent by the network device based on the BSR, and the second resource indication information indicates an uplink transmission resource used to transmit uplink data of the terminal device; and
the method further comprises:
sending, by the terminal device, the uplink data to the network device on the uplink transmission resource indicated by the second resource indication information.

10. The method according to claim 9, wherein the first status information comprises a size of to-be-transmitted uplink data of the terminal device.

11. The method according to claim 1, wherein the sending, by a terminal device, control information to a network device on a grant-free transmission resource comprises:
sending, by the terminal device, a first preamble sequence to the network device on the grant-free transmission resource, wherein the first preamble sequence is used to indicate the control information.

12. A grant-free transmission method, wherein the method comprises:
receiving, by a network device on a grant-free transmission resource, control information sent by a terminal device; and
sending, by the network device, feedback information to the terminal device based on the control information,
wherein the control information comprises a timing advance (TA) request message when a moving speed of the terminal device multiplied by a moving time of the terminal device exceeds a threshold, and the feedback information comprises TA information sent by the network device based on the TA request message.

13. The method according to claim 12, wherein the method further comprises:
sending, by the network device, capability information to the terminal device, wherein the capability information is used to indicate that the network device is capable of receiving, on the grant-free transmission resource, the control information sent by the terminal device.

14. The method according to claim 12, wherein the sending, by the network device, feedback information to the terminal device based on the control information comprises:
sending, by the network device, the feedback information to the terminal device in a second subframe following a first subframe that is used to receive the control information, wherein an interval between the second subframe and the first subframe meets a preset interval.

15. The method according to claim 12, wherein the receiving, by a network device on a grant-free transmission resource, control information sent by a terminal device comprises:
receiving, by the network device on the grant-free transmission resource, a first preamble sequence sent by the terminal device, wherein the first preamble sequence is used to indicate the control information.

16. The method according to claim 12, wherein the control information comprises location information of the terminal device, and the feedback information comprises location confirmation information sent by the network device based on the location information.

17. The method according to claim 16, wherein the method further comprises:
- receiving, by the network device on the grant-free transmission resource, a second preamble sequence sent by the terminal device, wherein the second preamble sequence is used to indicate that the terminal device requests to send the location information to the network device; and
- sending, by the network device, first resource indication information to the terminal device based on the second preamble sequence, wherein the first resource indication information indicates an uplink grant-free transmission resource used to send the location information; and
- the receiving, by a network device on a grant-free transmission resource, control information sent by a terminal device comprises:
- receiving, by the network device on the uplink grant-free transmission resource, the location information sent by the terminal device.

* * * * *